(12) United States Patent
Hendry

(10) Patent No.: US 12,335,461 B2
(45) Date of Patent: Jun. 17, 2025

(54) IMAGE CODING METHOD BASED ON INFORMATION INCLUDED IN PICTURE HEADER IN VIDEO OR IMAGE CODING SYSTEM

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 17/918,439

(22) PCT Filed: Apr. 7, 2021

(86) PCT No.: PCT/KR2021/004351
§ 371 (c)(1),
(2) Date: Oct. 12, 2022

(87) PCT Pub. No.: WO2021/210841
PCT Pub. Date: Oct. 21, 2021

(65) Prior Publication Data
US 2023/0136821 A1    May 4, 2023

Related U.S. Application Data

(60) Provisional application No. 63/010,705, filed on Apr. 16, 2020.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/176* (2014.11); *H04N 19/46* (2014.11)

(58) Field of Classification Search
CPC .. H04N 19/105; H04N 19/132; H04N 19/176; H04N 19/46; H04N 19/70; H04N 19/172; H04N 19/423
See application file for complete search history.

(56) References Cited

U.S. PATENT DOCUMENTS

| | | |
|---|---|---|
| 2020/0107045 A1 | 4/2020 | Wang et al. |
| 2021/0120245 A1 | 4/2021 | Kawaguchi et al. |

(Continued)

FOREIGN PATENT DOCUMENTS

| | | |
|---|---|---|
| KR | 10-2014-0071274 A | 6/2014 |
| KR | 10-2017-0115060 A | 10/2017 |

(Continued)

OTHER PUBLICATIONS

Coban et al. Joint Video Experts Team (JVET) of ITU-T SG 16 WP 3 and ISO/IEC JTC 1/SC 29/WG 11, 17th Meeting: Brussels, BE, Jan. 7-17, 2020, AHG9: On picture header IRAP/GDR signalling (Year: 2020) (Identified in IDS dated Oct. 12, 2022).*

(Continued)

*Primary Examiner* — Richard A Hansell, Jr.
(74) *Attorney, Agent, or Firm* — Bryan Cave Leighton Paisner LLP

(57) ABSTRACT

According to the disclosure of the present document, image information acquired through a bitstream may include a picture header including information related to a reference picture list, the picture header may include a non-reference picture flag related to whether a current picture is not used as a reference picture, and the non-reference picture flag may be included in a fixed location relative to a starting point of the picture header in the picture header. As a result, it is possible to derive the effect of enhancing prediction performance and coding efficiency in a video/image coding.

12 Claims, 13 Drawing Sheets

(51) Int. Cl.
  *H04N 19/176* (2014.01)
  *H04N 19/46* (2014.01)

(56) References Cited

U.S. PATENT DOCUMENTS

| | | | |
|---|---|---|---|
| 2021/0281832 A1* | 9/2021 | He | H04N 19/172 |
| 2021/0314624 A1* | 10/2021 | Coban | H04N 19/174 |
| 2023/0016439 A1* | 1/2023 | Deshpande | H04N 19/70 |
| 2023/0022497 A1* | 1/2023 | Wang | H04N 19/31 |
| 2023/0023488 A1* | 1/2023 | Unno | H04N 19/86 |
| 2023/0026475 A1* | 1/2023 | Deshpande | H04N 19/172 |
| 2023/0179802 A1* | 6/2023 | Laroche | H04N 19/70 375/240.02 |
| 2023/0388487 A1* | 11/2023 | Choi | H04N 19/70 |

FOREIGN PATENT DOCUMENTS

| | | | |
|---|---|---|---|
| KR | 10-2032770 B1 | 10/2019 | |
| TW | 202002629 A | 1/2020 | |
| WO | WO-2021061285 A1 * | 4/2021 | H04N 1/64 |

OTHER PUBLICATIONS

Coban et al. Joint Video Experts Team (JVET) of ITU-T SG 16 WP 3 and ISO/IEC JTC 1/SC 29/WG 11, 17th Meeting: Brussels, BE, Jan. 7-17, 2020, AHG9: On picture header IRAP/GDR signalling (Identified in IDS dated Oct. 12, 2022) (Year: 2020).*

Benjamin Bross, et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q2001-vE.

Muhammed Coban, et al., "AHG9: On picture header IRAP/GDR signalling", Joint Video Experts Team (JVET) of ITU-T SG 16 WP 3 and ISO/IEC JTC 1/SC 29/WG 11, 17th Meeting: Brussels, BE, Jan. 7-17, 2020. JVET-Q0154.

* cited by examiner

IMAGE CODING METHOD BASED ON INFORMATION INCLUDED IN PICTURE HEADER IN VIDEO OR IMAGE CODING SYSTEM

CROSS-REFERENCE TO RELATED APPLICATION

This application is the National Stage filing under 35 U.S.C. 371 of International Application No. PCT/KR2021/004351, filed Apr. 7, 2021, which claims priority to and the benefit of U.S. Provisional Application No. 63/010,705, filed on Apr. 16, 2020, the disclosure of which is incorporated herein by reference in its entirety.

BACKGROUND OF THE DISCLOSURE

Field of the Disclosure

The present document relates to a video/image coding technology, and more specifically, to an image coding method based on information included in a picture header in a video or image coding system.

Related Art

Recently, the demand for high resolution, high quality image/video such as 4K or 8K Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

An exemplary embodiment of the present document provides a method and an apparatus for enhancing video/image coding efficiency.

An exemplary embodiment of the present document provides a method and an apparatus for signaling information related to a reference picture list.

An exemplary embodiment of the present document provides a method and an apparatus for signaling information included in a picture header.

An exemplary embodiment of the present document provides a method and an apparatus for signaling information related to whether a current picture is not used as a reference picture at a fixed location relative to a starting point of a picture header.

An exemplary embodiment of the present document provides a method and an apparatus for signaling information related to a picture parameter set ID in use at a fixed location relative to the starting point of the picture header.

An exemplary embodiment of the present document provides a method and an apparatus for coding information related to the picture parameter set ID in use in the picture header based on an unsigned integer using 6 bits.

An exemplary embodiment of the present document provides a video/image decoding method performed by a decoding apparatus.

An exemplary embodiment of the present document provides a decoding apparatus for performing a video/image decoding.

An exemplary embodiment of the present document provides a video/image encoding method performed by an encoding apparatus.

An exemplary embodiment of the present document provides an encoding apparatus for performing video/image encoding.

An exemplary embodiment of the present document provides a computer readable digital storage medium in which encoded video/image information generated by the vide/image encoding method disclosed in at least one of the exemplary embodiments of the present document is stored.

An exemplary embodiment of the present document provides a computer readable digital storage medium in which encoded information or encoded video/image information causing the vide/image decoding method disclosed in at least one of the exemplary embodiments of the present document to be performed by the decoding apparatus is stored.

The exemplary embodiment of the present document may enhance the overall image/video compression efficiency.

The exemplary embodiment of the present document may signal the information related to the reference picture list.

The exemplary embodiment of the present document may signal the information included in the picture header.

The exemplary embodiment of the present document may signal the information related to whether the current picture is not used as the reference picture at the fixed location relative to the starting point of the picture header.

The exemplary embodiment of the present document may signal the information related to the picture parameter set ID in use at the fixed location relative to the starting point of the picture header.

The exemplary embodiment of the present document may code the information related to the picture parameter set ID in use in the picture header based on the unsigned integer using 6 bits.

DESCRIPTION OF EXEMPLARY EMBODIMENTS

Figure 1:
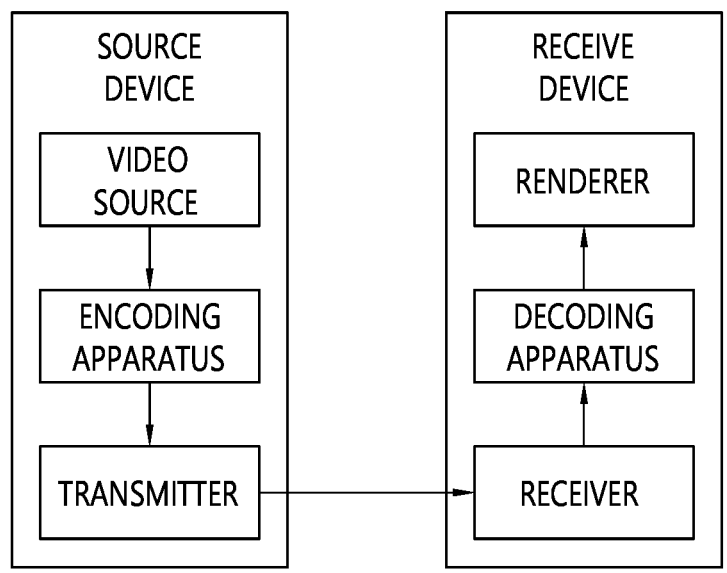
FIG. 1 schematically illustrates an example of a video/image coding system to which exemplary embodiments of the present document are applicable.

This document may be modified in various forms, and specific embodiments thereof will be described and shown in the drawings. However, the embodiments are not intended for limiting this document. The terms used in the following description are used to merely describe specific embodiments, but are not intended to limit this document. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this document are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this document without departing from the spirit of this document.

Hereinafter, exemplary embodiments of this document will be described in detail with reference to the accompanying drawings. Hereinafter, the same reference numerals are used for the same components in the drawings, and redundant description of the same components may be omitted.

FIG. 1 schematically illustrates an example of a video/image coding system to which exemplary embodiments of the present document are applicable.

Referring to FIG. 1, a video/image coding system may include a first apparatus (a source device) and a second apparatus (a receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to a video/image coding. For example, methods/exemplary embodiments disclosed in the present document are applicable to a method disclosed in a versatile video coding (VVC) standard. Further, the methods/exemplary embodiments disclosed in the present document are applicable to a method disclosed in an essential video coding (EVC) standard, an AOMedia Video 1 (AV1) standard, a 2nd generation of audio video coding (AVS2) standard, or a next-generation video/image coding standard (e.g., H.267 or H.268).

This document presents various embodiments of video/image coding, and the embodiments may be performed in combination with each other unless otherwise mentioned.

In the present document, a video may mean a group of a series of images over time. A picture generally means a unit representing one image in a specific time period, and a slice and a tile are units constituting a part of a picture in coding. The slice/tile may include one or more coding tree units (CTUs). One picture may be composed of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit.

Meanwhile, one picture may be divided into two or more subpictures. The subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex., Cb, cr) blocks. The unit may be used interchangeably with terms such as block or area in some cases. In a general case, an M×N block may include samples (or sample arrays) or a set (or array) of transform coefficients of M columns and N rows.

In the present document, "A or B" may mean "only A", "only B", or "both A and B". In other words, in the present document, "A or B" may be interpreted as "A and/or B". For example, in the present document, "A, B, or C" may mean "only A", "only B", "only C", or "any combination of A, B, and C".

A slash (/) or a comma used in the present document may mean "and/or". For example, "A/B" may mean "A and/or B". Therefore, "A/B" may mean "only A", "only B", or "both A and B". For example, "A, B, C" may mean "A, B, or C".

In the present document, "at least one of A and B" may mean "only A", "only B", or "both A and B". Further, in the present document, expressions of "at least one of A or B" or "at least one of A and/or B" may be interpreted the same as "at least one of A and B".

Further, in the present document, "at least one of A, B, and C" may mean "only A", "only B", "only C", or "any combination of A, B, and C". Further, "at least one of A, B, or C" or "at least one of A, B, and/or C" may mean "at least one of A, B, and C".

Further, a parenthesis used in the present document may mean "for example". Specifically, if it is indicated by a "prediction (intra prediction)", an "intra prediction" may be proposed as an example of the "prediction". In other words, the "prediction" in the present document is not limited to the "intra prediction", and the "intra prediction" may be proposed as the example of the "prediction". Further, even if it is indicated by a "prediction (i.e., intra prediction)", the "intra prediction" may be proposed as the example of the "prediction".

In the present document, a technical feature individually described in one drawing may also be individually implemented, and also be simultaneously implemented.

Figure 2:
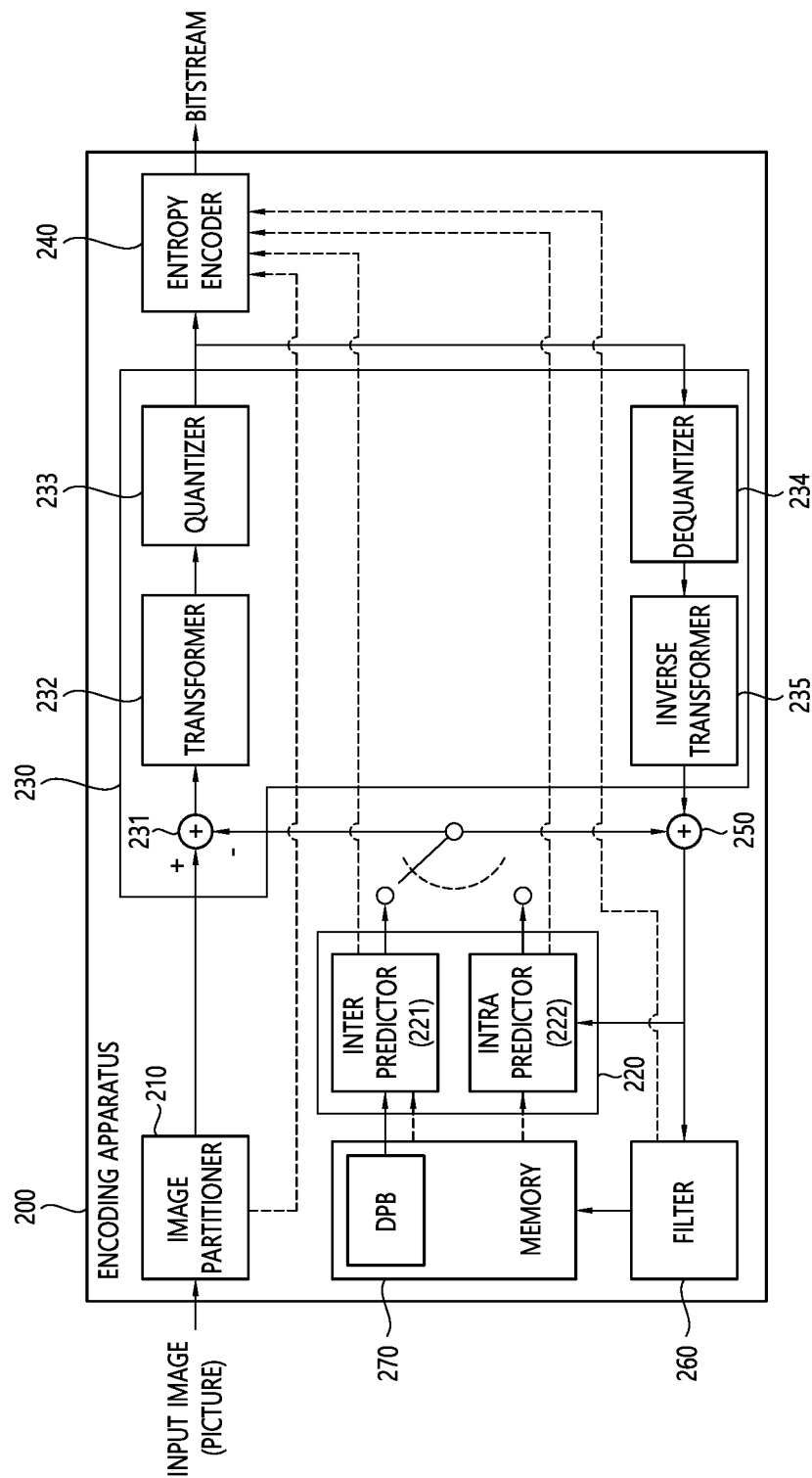
FIG. 2 is a diagram for schematically explaining a configuration of a video/image encoding apparatus to which the exemplary embodiments of the present document are applicable.

FIG. 2 is a diagram for schematically explaining a configuration of a video/image encoding apparatus to which exemplary embodiments of the present document are applicable. Hereinafter, the encoding apparatus may include an image encoding apparatus and/or a video encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to this document may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various kinds of information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. Encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In this document, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various kinds of information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
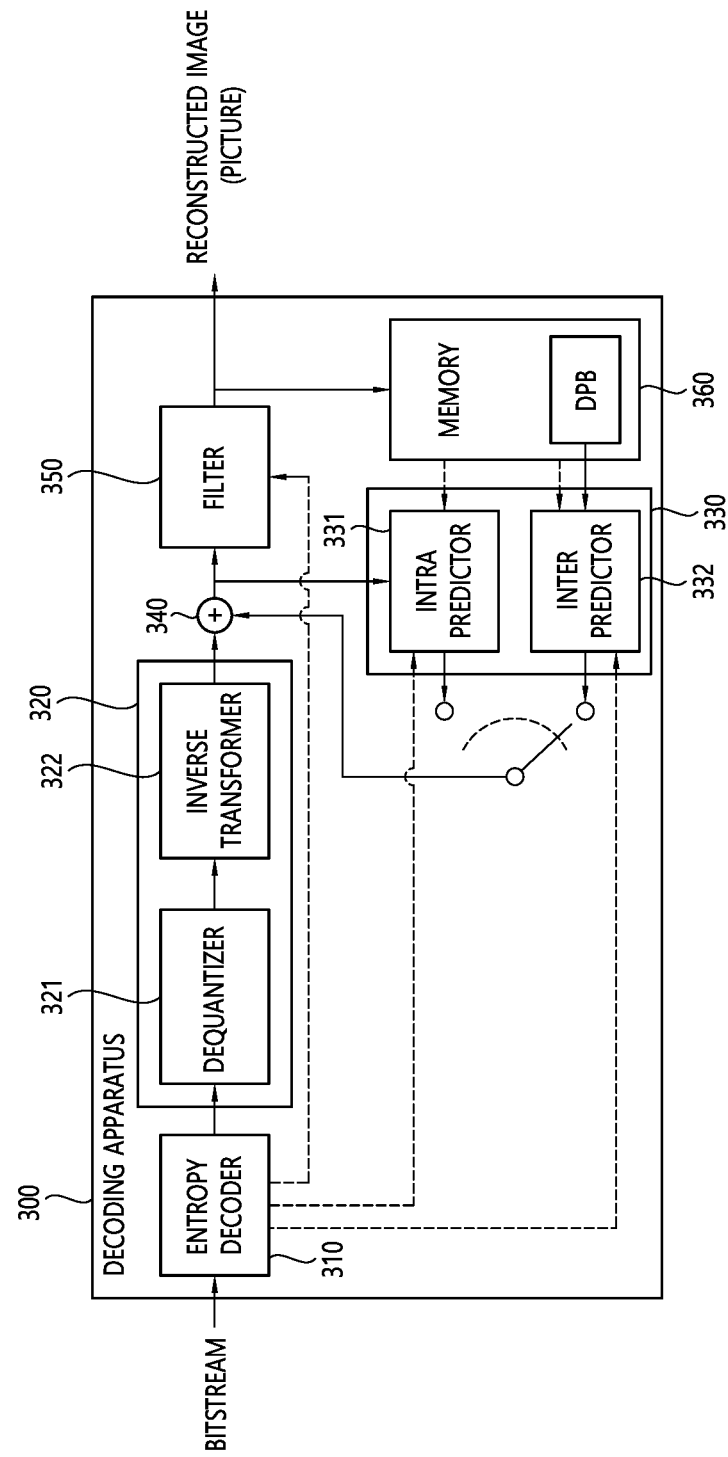
FIG. 3 is a diagram for schematically explaining a configuration of a video/image decoding apparatus to which the exemplary embodiments of the present document are applicable.

FIG. 3 is a diagram schematically explaining a configuration of a video/image decoding apparatus to which exemplary embodiments of the present document are applicable. Hereinafter, the decoding apparatus may include an image decoding apparatus and/or a video decoding apparatus.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to this document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor 330 may perform prediction on the current block and generate a predicted block including prediction samples for the current block. The predictor 330 may determine whether intra prediction or inter prediction is applied to the current block based on the information on the prediction output from the entropy decoder 310 and may determine a specific intra/inter prediction mode.

The predictor 330 may generate a prediction signal based on various prediction methods described below. For example, the predictor 330 may not only apply intra prediction or inter prediction to predict one block but also simultaneously apply intra prediction and inter prediction. This may be called combined inter and intra prediction (CIIP). In addition, the predictor 330 may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in this document. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block. The intra predictor 331 may predict the current block by referring to the samples in the current picture. The referenced samples may be located in the neighborhood of the current block or may be located apart according to the prediction mode. In intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 332 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In this document, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization are omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Figure 4:
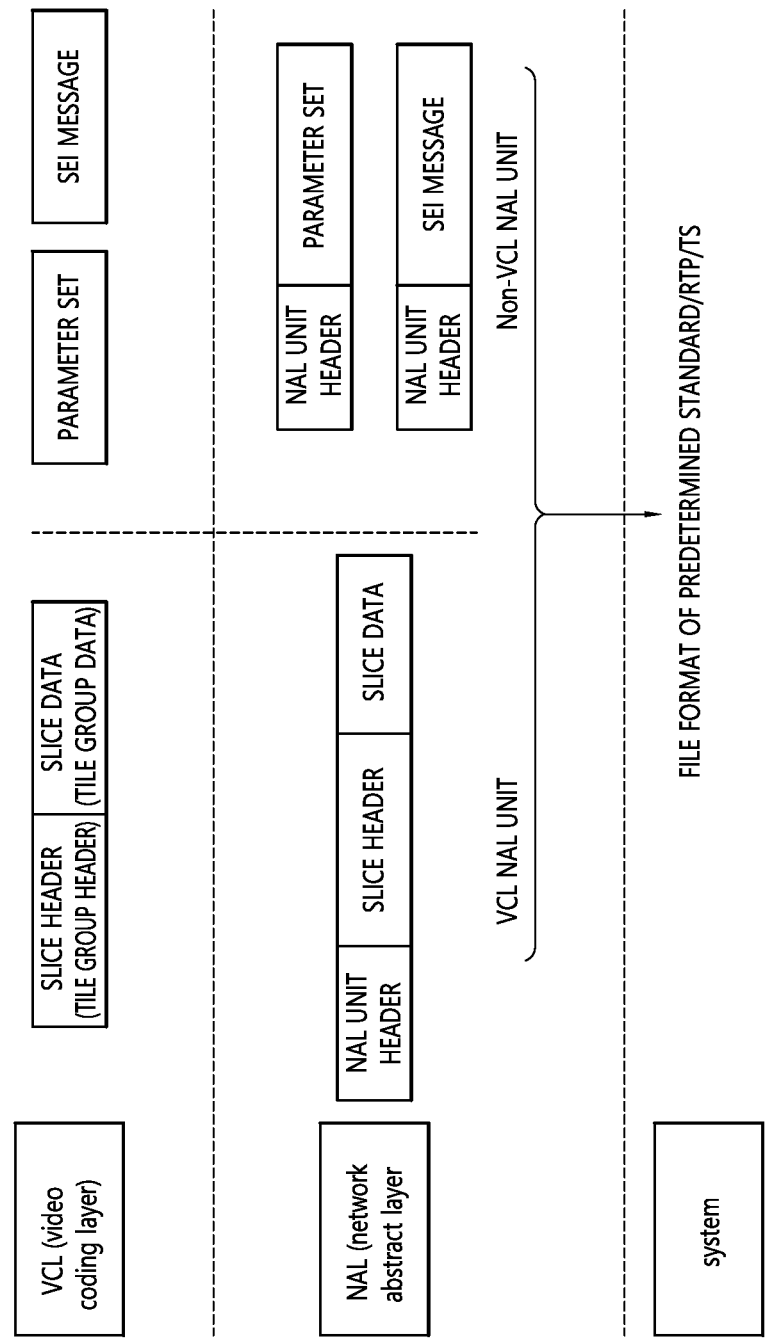
FIG. 4 exemplarily illustrates a hierarchical structure for the coded video/image.

FIG. 4 exemplarily illustrates a hierarchical structure for the coded video/image.

Referring to FIG. 4, the coded video/image may be classified into a video coding layer (VCL) which deals with a decoding processing of videos/images and themselves, a subsystem for transmitting and storing encoded information, and a network abstraction layer which exists between the VCL and the subsystem and is in charge of a network adaption function.

For example, in the VCL, VCL data including compressed image data (slice data) may be generated or a parameter set including a picture parameter set (PPS), a sequence parameter set (SPS), a video parameter set (VPS), or a supplemental enhancement information (SEI) message additionally necessary for the image decoding process may be generated.

Further, for example, in the NAL, an NAL unit may be generated by adding header information (NAL unit header) to a raw byte sequence payload (RBSP) generated in the VCL. In this case, the RBSP may refer to the slice data, parameter set, and SEI message generated in the VCL. The NAL unit header may include NAL unit type information designated according to the RBSP data included in the corresponding NAL unit.

Further, for example, as illustrated in FIG. 4, the NAL unit may be classified into a VCL NAL unit and a non-VCL NAL unit according to the RBSP generated in the VCL. The VCL NAL unit may mean the NAL unit including information about the image (slice data), and the non-VCL NAL unit may mean the NAL unit including information necessary for the image decoding (parameter set or SEI message).

The aforementioned VCL NAL unit and non-VCL NAL unit may be transmitted through a network by attaching header information according to a data standard of the subsystem. For example, the NAL unit may be transformed into a predetermined data format of the standard, such as H.266/VVC file format, a real-time transport protocol (RTP), or a transport stream (TS), and transmitted through various networks.

Further, as described above, a NAL unit type may designated for the NAL unit according to a data structure of the RBSP included in the corresponding NAL unit, and the information about the NAL unit type may be stored in and signaled to the NAL unit header.

For example, the NAL unit may be classified into a VCL NAL unit type and a non-VCL NAL unit type according to whether to include the information about the image (slice data). Further, the VCL NAL unit type may be classified according to the property and type of picture included in the VCL NAL unit, and the non-VCL NAL unit type may be classified according to the type of parameter set.

The following description may be an example of the NAL unit type designated according to the type of parameter set included in the non-VCL NAL unit type.

An adaptation parameter set (APS) NAL unit: Type for the NAL unit including the APS A decoding parameter set (DPS) NAL unit: Type for the NAL unit including the DPS A video parameter set (VPS) NAL unit: Type for the NAL unit including the VPS A sequence parameter set (SPS) NAL unit: Type for the NAL unit including the SPS A picture parameter set (PPS) NAL unit: Type for the NAL unit including the PPS A picture header (PH) NAL unit: Type for the NAL unit including the PH The aforementioned NAL unit types may have syntax information about the NAL unit type, and the syntax information may be stored in and signaled to the NAL unit header. For example, the syntax information may be nal_unit_type, and the NAL unit type may be designated as a value of the nal_unit_type.

Meanwhile, as described above, one picture may include a plurality of slices, and the slice may include a slice header and a slice data. In this case, one picture header may be added to (embedded in) the plurality of slices (a set of the slice header and the slice data). The picture header (picture header syntax) may include information/parameters commonly applicable to the picture. The slice header (slice header syntax) may include information/parameters commonly applicable to the slice. The APS (APS syntax) or the PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to a plurality of layers. The DPS (DPS syntax) may include information/parameters commonly applicable to the entire image. The DPS may include information/parameters related to the concatenation of a coded video sequence (CVS). In the present document, a high level syntax (HLS) may include at least one of the APS syntax, the PPS syntax, the SPS syntax, the VPS syntax, the DPS syntax, the picture header syntax, and the slice header syntax.

Meanwhile, as described above, one NAL unit type may be generally set for one picture, and as described above, the NAL unit type may be signaled through the nal_unit_type in the NAL unit header of the NAL unit including the slice. The following Table expresses an example of NAL unit type codes an NAL unit type classes.

TABLE 1

| nal_unit_type | Name of nal_unit_type | Content of NAL unit and RBSP syntax structure | NAL unit type class |
|---|---|---|---|
| 0 | TRAIL_NUT | Coded slice of a trailing picture slice_layer_rbsp( ) | VCL |
| 1 | STSA_NUT | Coded slice of an STSA picture slice_layer_rbsp( ) | VCL |
| 2 | RADL_NUT | Coded slice of a RADL picture slice_layer_rbsp( ) | VCL |
| 3 | RASL_NUT | Coded slice of a RASL picture slice_layer_rbsp( ) | VCL |
| 4..6 | RSV_VCL_4.. RSV_VCL_6 | Reserved non-IRAP VCL NAL unit types | VCL |
| 7 8 | IDR_W_RADL IDR_N_LP | Coded slice of an IDR picture slice_layer_rbsp( ) | VCL |
| 9 | CRA_NUT | Coded slice of a CRA picture silce_layer_rbsp( ) | VCL |
| 10 | GDR_NUT | Coded slice of a GDR picture slice_layer_rbsp( ) | VCL |
| 11 12 | RSV_IRAP_11 RSV_IRAP_12 | Reserved IRAP VCL NAL unit types | VCL |
| 13 | DPS_NUT | Decoding parameter set decoding_parameter_set_rbsp( ) | non-VCL |
| 14 | VPS_NUT | Video parameter set video_parameter_set_rbsp( ) | non-VCL |
| 15 | SPS_NUT | Sequence parameter set seq_parameter_set_rbsp( ) | non-VCL |
| 16 | PPS_NUT | Picture parameter set pic_parameter_set_rbsp( ) | non-VCL |
| 17 18 | PREFIX_APS_NUT SUFFIX_APS_NUT | Adaptation parameter set adaptation_parameter_set_rbsp( ) | non-VCL |
| 19 | PH_NUT | Picture header picture_header_rbsp( ) | non-VCL |
| 20 | AUD_NUT | AU delimiter access_unit_delimiter_rbsp( ) | non-VCL |
| 21 | EOS_NUT | End of sequence end_of_seq_rbsp( ) | non-VCL |
| 22 | EOB_NUT | End of bitstream end_of_bitstream_rbsp( ) | non-VCL |
| 23 24 | PREFIX_SEI_NUT SUFFIX_SEI_NUT | Supplemental enhancement information sei_rbsp( ) | non-VCL |
| 25 | FD_NUT | Filler data filler_data_rbsp( ) | non-VCL |
| 26 27 | RSV_NVCL_26 RSV_NVCL_27 | Reserved non-VCL NAL unit types | non-VCL |
| 28..31 | UNSPEC_28.. UNSPEC_31 | Unspecified non-VCL NAL unit types | non-VCL |

In this regard, a clean random access (CRA) picture may be related to a random access skipped leading (RASL) picture or a random access decodable leading (RADL) picture, which exists in a bitstream. An instantaneous decoding refresh (IDR) picture with the same nal_unit_type as that of the variable IDR_N_LP does not have a related leading picture in the bitstream. In other words, the IDR picture with the same nal_unit_type as that of the variable IDR_W_RADL does not have a related RASL picture in the bitstream, but may have a related RADL picture. The IDR picture is an IRAP picture in which each VCL_NAL unit has the same nal_unit_type as that of the IDRA_W_RADL or the IDR_N_LP.

In performing the decoding procedure, the IDR picture does not use the inter prediction and may be a picture whose decoding order in the bitstream is first. Alternatively, the IDR picture may appear in the bitstream later. Each IDR picture may be a picture whose decoding order in the CVS may be first. The IDR picture in which each VCL_NAL unit has the same nal_unit_type as that of the IDR_W_RADL may have the related RADL picture. The IDR picture in which each VCL_NAL unit has the same nal_unit_type as that of the IDR_N_LP does not have the related leading picture. In other words, the IDR picture does not have the related RASL pictures.

Meanwhile, the VVC may support a gradual decoding refresh (GDR) function. The GDR function may mean a function in which the decoding may start from the reconstructed picture in which all parts are not correctly decoded but the correctly decoded parts of the reconstructed picture gradually increase in a lower (sub) sequence picture such that the entire picture is correctly decoded. A picture in which the decoding process may start with the GDR function may be referred to as a GDR picture, and a picture immediately following the GDR picture in which the entire picture is correctly decoded may be referred to as a recovery point picture. At this time, for example, the GDR picture may be identified as the NAL unit type of GDR_NUT.

Meanwhile, as described above, the picture may be composed of one or more slices. Further, parameters explaining the picture may be signaled to the picture header (PH), and parameters explaining the slice may be signaled to the slice header (SH). The PH may be delivered in its NAL unit type. Further, the SH may exist in a starting part of the NAL unit including the payload of the slice (i.e., slice data).

In the present document, the video/image information encoded from the encoding apparatus to the decoding apparatus and signaled in the form of the bitstream may include information included in the slice header, information included in the picture header, information included in the APS, information included in the PPS, information included in the SPS, information included in the VPS, and/or information included in the DPS as well as partitioning-related information in the picture, intra/inter prediction information, residual information, and in-loop filtering information. Further, the video/image information may further include information of the NAL unit header.

If the inter prediction is applied, the predictors of the encoding apparatus/the decoding apparatus may derive the prediction samples by performing the inter prediction in units of block. The inter prediction may be a prediction derived in a manner that is dependent on data elements (e.g., sample values or motion information) of the picture(s) other than the current picture. If the inter prediction is applied to the current block, a predicted block (prediction sample array) for the current block may be induced based on a reference block (reference sample array) specified by the motion vector on the reference picture indicated by the reference picture index. At this time, to reduce an amount of the motion information transmitted in the inter prediction mode, the motion information of the current block may be predicted in units of block, subblock, or sample based on the correlation of the motion information between the neighboring block and the current block. The motion information may include the motion vector and the reference picture index. The motion information may further include inter prediction type (L0 prediction, L1 prediction, and Bi prediction) information. If the inter prediction is applied, the neighboring block may include a spatial neighboring block existing in the current picture and a temporal neighboring block existing in the reference picture. The reference picture including the reference block and the reference picture including the temporal neighboring block may also be the same, and also be different. The temporal neighboring block may be referred to as a collocated reference block or a collocated CU (colCU), and the reference picture including the temporal neighboring block may be referred to as a collocated picture (colPic). For example, a motion information candidate list may be constituted based on the neighboring blocks of the current block, and a flag or index information indicating which candidate is selected (used) to derive the motion vector of the current block and/or the reference picture index may be signaled. The inter prediction may be performed based on various prediction modes, and for example, in the skip mode and the merge mode, the motion information of the current block may be the same as the motion information of the selected neighboring block. In the skip mode, the residual signal may not be transmitted unlike in the merge mode. In the motion vector prediction (MVP) mode, the motion vector of the selected neighboring block may be used as a motion vector predictor, and a motion vector difference may be signaled. In this case, the motion vector of the current block may be derived by using the sum of the motion vector predictor and the motion vector difference.

The motion information may include L0 motion information and/or L1 motion information according to the inter prediction types (L0 prediction, L1 prediction, and Bi prediction). A motion vector in an L0 direction may be referred to as an L0 motion vector or an MVL0, and a motion vector in an L1 direction may be referred to as an L1 motion vector or an MVL1. A prediction based on the L0 motion vector may be referred to as the L0 prediction, a prediction based on the L1 motion vector may be referred to as the L1 prediction, and a prediction based on both the L0 motion vector and the L1 motion vector may be referred to as the Bi prediction. Here, the L0 motion vector may refer to a motion vector associated with a reference picture list L0 (L0), and the L1 motion vector may refer to a motion vector associated with a reference picture list L1 (L1). The reference picture list L0 may include pre-pictures of the current picture on the output order as the reference pictures, and the reference picture list L1 may include post-pictures of the current picture on the output order. The pre-pictures may be referred to as a forward (reference) picture, and the post-pictures may be referred to as a backward (reference) picture. The reference picture list L0 may further include the post-pictures of the current picture as the reference pictures on the output order. In this case, in the reference picture list L0, the pre-pictures may be first indexed and then the post-pictures may be indexed. The reference picture list L1 may further include the pre-pictures of the current picture on the output order as the reference pictures. In this case, in the reference picture list L1, the post-pictures may be first indexed and then the pre-pictures may be indexed. Here, the output order may correspond to a picture order count (POC) order.

A video/image encoding procedure based on the inter prediction may schematically include the following description, for example.

Figure 5:
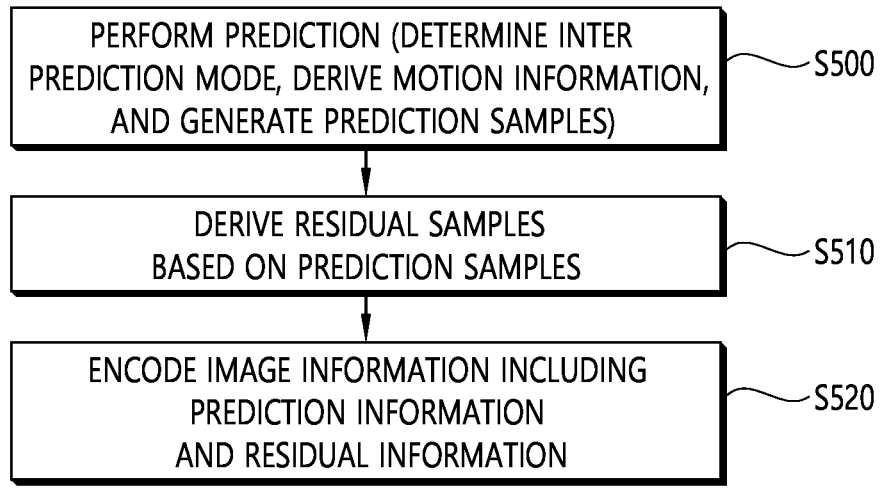
FIGS. 5 and 6 schematically illustrate examples of a video/image encoding method based on inter prediction and an inter predictor in an encoding apparatus.
Figure 6:
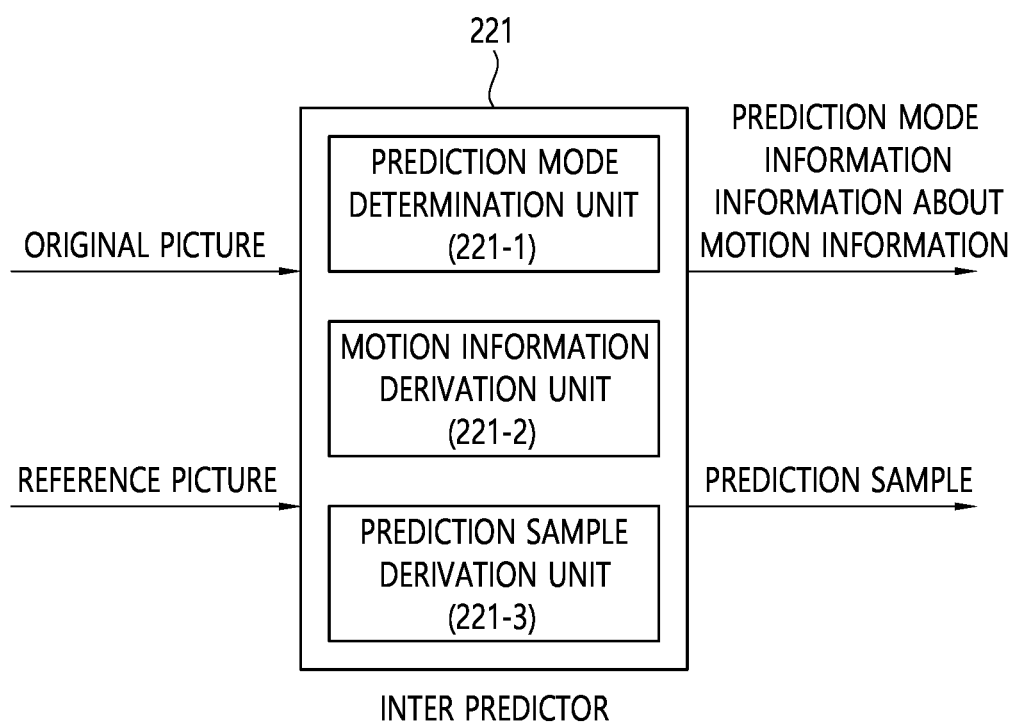

FIGS. 5 and 6 schematically illustrate examples of a video/image encoding method based on the inter prediction and the inter predictor in the encoding apparatus.

Referring to FIGS. 5 and 6, the encoding apparatus performs inter prediction for a current block (S500). The encoding apparatus may derive an inter prediction mode and motion information of the current block and generate prediction samples of the current block. Here, procedures of determining the inter prediction mode, deriving the motion information, and generating the prediction samples may also be simultaneously performed, and any one procedure may also be performed prior to other procedures. For example, the inter predictor 221 of the encoding apparatus may include a prediction mode determination unit 221-1, a motion information derivation unit 221-2, and a prediction sample derivation unit 221-3, in which the prediction mode determination unit 221-1 may determine the prediction mode for the current block, the motion information derivation unit 221-2 may derive the motion information of the current block, and the prediction sample derivation unit 221-3 may derive the prediction samples of the current block. For example, the inter predictor 221 of the encoding apparatus may search for a block similar to the current block in a certain region (search region) of the reference pictures through motion estimation and derive a reference block in which a difference with the current block is minimum or a certain standard or less. Based on the above, the reference picture index indicating the reference picture at which the reference block is located may be derived, and the motion vector may be derived based on a difference between locations of the reference block and the current block. The encoding apparatus may determine a mode applied to the current block among various prediction modes. The encoding apparatus may compare RD costs for various prediction modes and determine an optimal prediction mode for the current block.

For example, if the skip mode or the merge mode is applied to the current block, the encoding apparatus may constitute a merge candidate list to be described later and derive a reference block in which a difference with the current block is minimum or a certain standard or less among the reference blocks indicated by merge candidates included in the merge candidate list. In this case, the merge candidate associated with the derived reference block may be selected, and the merge index information indicating the selected merge candidate may be generated to be signaled to the decoding apparatus. The motion information of the current block may be derived by using the motion information of the selected merge candidate.

As another example, if the (A)MVP mode is applied to the current block, the encoding apparatus may constitute an (A)MVP candidate list to be described later and use the motion vector of the selected mvp candidate among the motion vector predictor (mvp) candidates included in the (A)MVP candidate list as an mvp of the current block. In this case, for example, the motion vector indicating the reference block derived by the aforementioned motion estimation may be used as the motion vector of the current block, and an mvp candidate having the motion vector having the smallest difference with the motion vector of the current block among the mvp candidates may become the selected mvp candidate. The motion vector difference (MVD), which is a difference obtained by subtracting the mvp from the motion vector of the current block, may be derived. In this case, information about the MVD may be signaled to the decoding apparatus. Further, if the (A)MVP mode is applied, a value of the reference picture index may be composed of reference picture index information and separately signaled to the decoding apparatus.

The encoding apparatus may derive residual samples based on the prediction samples (S510). The encoding apparatus may derive the residual samples through a comparison between original samples and the prediction samples of the current block.

The encoding apparatus encodes image information including prediction information and residual information (S520). The encoding apparatus may output the encoded image information in the form of a bitstream. The prediction information as information related to the prediction procedure may include information about the prediction mode information (e.g., a skip flag, a merge flag, or a mode index) and the motion information. The information about the motion information may include candidate selection information (e.g., a merge index, an mvp flag, or an mvp index), which is information for deriving the motion vector. Further, the information about the motion information may include the aforementioned information about the MVD and/or reference picture index information. Further, the information about the motion information may include information representing whether L0 prediction, L1 prediction, or B1 prediction is applied. The residual information is information about the residual samples. The residual information may include information about quantized transform coefficients for the residual samples.

The output bitstream may be stored in a (digital) storage medium and delivered to the decoding apparatus, or also be delivered to the decoding apparatus through a network.

Meanwhile, as described above, the encoding apparatus may generate a reconstructed picture (including reconstructed samples and a reconstructed block) based on the reference samples and the residual samples. This is to derive the same prediction result as that obtained by being performed by the decoding apparatus in the encoding apparatus, and as a result, it is possible to enhance coding efficiency. Therefore, the encoding apparatus may store the reconstructed picture (or the reconstructed samples and the reconstructed block) in a memory and use the reconstructed picture as the reference picture for the inter prediction. As described above, the in-loop filtering procedure or the like may be further applied to the reconstructed picture.

The video/image decoding procedure based on the inter prediction may schematically include the following description, for example.

Figure 7:
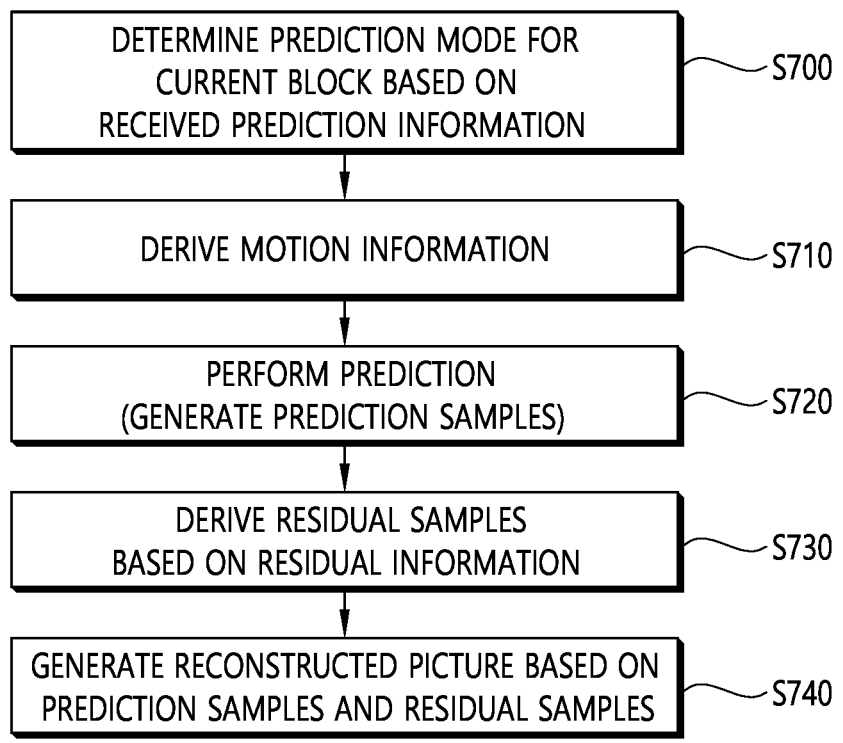
FIGS. 7 and 8 schematically illustrate examples of a video/image decoding method based on the inter prediction and an inter predictor in a decoding apparatus.
Figure 8:
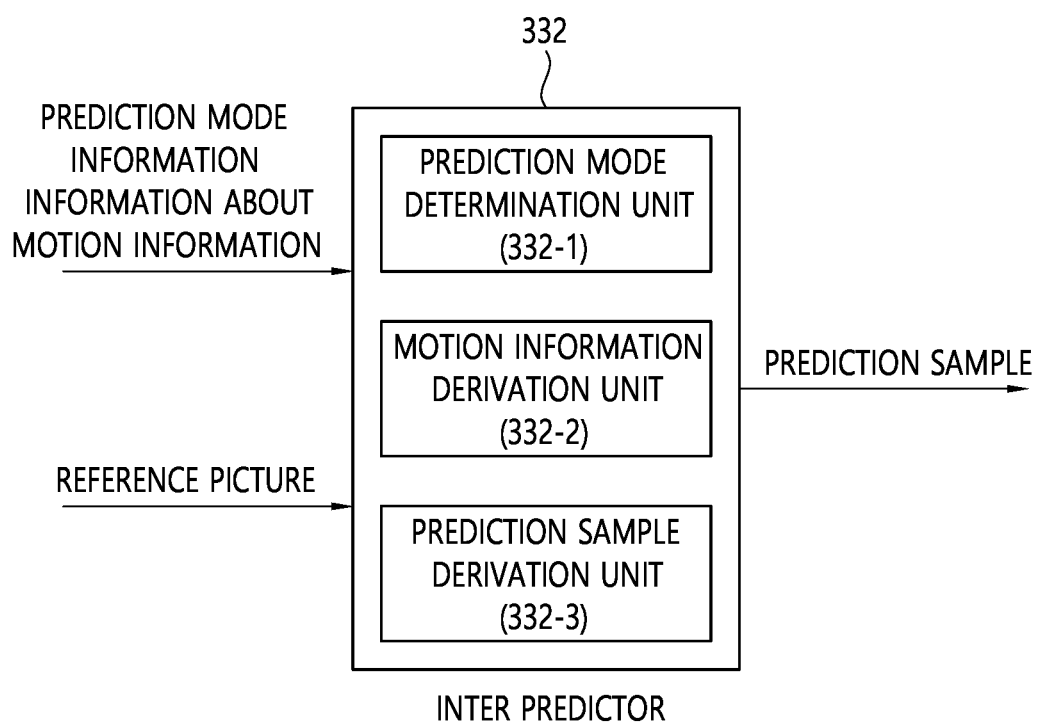

FIGS. 7 and 8 schematically illustrate examples of the video/image decoding method based on the inter prediction and the inter predictor in the decoding apparatus.

Referring to FIGS. 7 and 8, the decoding apparatus may perform an operation corresponding to the operation performed by the encoding apparatus. The decoding apparatus may perform the prediction for the current block based on the received prediction information and derive the prediction samples.

Specifically, the decoding apparatus may determine a prediction mode for the current block based on the received prediction information (S700). The decoding apparatus may determine which inter prediction mode is applied to the current block based on the prediction mode information in the prediction information.

For example, the decoding apparatus may determine whether the merge mode is applied to the current block or the (A)MVP mode is applied thereto based on the merge flag. Alternatively, the decoding apparatus may select one of various inter prediction mode candidates based on the mode index. The inter prediction mode candidates may include the skip mode, the merge mode, and/or the (A)MVP mode, or include various inter prediction modes to be described later.

The decoding apparatus derives motion information of the current block based on the determined inter prediction mode (S710). For example, if the skip mode or the merge mode is applied to the current block, the decoding apparatus may constitute a merge candidate list to be described later and select one merge candidate of the merge candidates included in the merge candidate list. The selection may be performed based on the aforementioned selection information (merge index). The motion information of the current block may be derived by using the motion information of the selected merge candidate. The motion information of the selected merge candidate may be used as the motion information of the current block.

As another example, if the (A)MVP mode is applied to the current block, the decoding apparatus may constitute an (A)MVP candidate list to be described later and use a motion vector of a selected mvp candidate among motion vector predictor (mvp) candidates included in the (A)MVP candidate list as an mvp of the current block. The selection may be performed based on the aforementioned selection information (the mvp flag or the mvp index). In this case, an MVD of the current block may be derived based on the information about the MVD, and the motion vector of the current block may be derived based on the mvp and MVD of the current block. Further, the reference picture index of the current block may be derived based on the reference picture index information. The picture indicated by the reference picture index in the reference picture list about the current block may be derived as the reference picture referenced for the inter prediction of the current block.

Meanwhile, as described later, the motion information of the current block may be derived without constituting the candidate list, and in this case, the motion information of the current block may be derived according to a procedure disclosed in the prediction mode to be described later. In this case, the constitution of the candidate list described above may be omitted.

The decoding apparatus may generate prediction samples for the current block based on the motion information of the current block (S720). In this case, the decoding apparatus may derive the reference picture based on the reference picture index of the current block and derive the prediction samples of the current block using the samples of the reference block indicated by the motion vector of the current block on the reference picture. In this case, as described later, a prediction sample filtering procedure for all or some of the prediction samples of the current block may be further performed in some cases.

For example, the inter predictor 332 of the decoding apparatus may include a prediction mode determination unit 332-1, a motion information derivation unit 332-2, and a prediction sample derivation unit 332-3, in which the prediction mode determination unit 332-1 may determine the prediction mode for the current block based on the received prediction mode information, the motion information derivation unit 332-2 may derive the motion information (the motion vector and/or the reference picture index) of the current block based on the information about the motion information received by the motion information derivation unit 332-2, and the prediction sample derivation unit 332-3 may derive the prediction samples of the current block.

The decoding apparatus generates residual samples for the current block based on received residual information (S730). The decoding apparatus may generate reconstructed samples for the current block based on the prediction samples and the residual samples and generate a reconstructed picture based on the generated reconstructed samples (S740). Thereafter, the in-loop filtering procedure or the like may be further applied to the reconstructed picture as described above.

As described above, the inter prediction procedure may include determining an inter prediction mode, deriving motion information according to the determined prediction mode, and preforming prediction (generating a prediction sample) based on the derived motion information. The inter prediction procedure may be performed by the encoding apparatus and the decoding apparatus as described above.

Meanwhile, as described above, the information and/or syntax elements delivered/signaled from the encoding apparatus to the decoding apparatus are encoded through the aforementioned encoding procedure and included in the bitstream, and the signaled/received information and/or syntax elements may be decoded through the aforementioned decoding procedure and acquired from the bitstream. At this time, for example, the decoding apparatus may perform a parsing, which is an operation of reading bits for the information and/or syntax elements of each of the bitstream to decode the signaled/received information and/or syntax elements.

For example, each of the following coding descriptors may indicate a parsing process for a specific syntax element.
  ae(v): a function of decoding a context-adaptive arithmetic entropy (CABAC)-coded syntax element
  b(8): a function of reading a byte having any pattern of bit? (8 bits). The parsing process for this descriptor is specified by the return value of a function read bits (8).
  f(n): a function of reading a fixed-pattern bit string using n bits written (from left to right) with the left bit first. The parsing process for this descriptor is specified by the return value of the function read_bits (n).
  i(n): a function of decoding the syntax element coded with a signed integer using n bits. When n is "v" in the syntax table, the number of bits varies in a manner dependent on the value of other syntax elements. The parsing process for this descriptor is specified by the return value of the function read_bits (n) interpreted as a two's complement integer representation with most significant bit (MSB) written first.
  se(v): a function of decoding a signed integer 0-th order Exp-Golomb-coded syntax element with the left bit first. The parsing process for this descriptor is specified with the order k equal to 0.
  st(v): a null-terminated string encoded as universal coded character set (UCS) transmission format-8 (UTF-8) characters as specified in ISO/JEC 10646. The parsing process for this descriptor is specified as follows: for example, st(v) begins at a byte-aligned location in the bitstream and reads and returns a series of bytes from the bitstream, beginning at the current location and continuing up to but not including the next byte-aligned byte that is equal to 0x00, and advances the bitstream pointer by (stringLength+1)*8 bit locations, where stringLength is equal to the number of bytes returned. The st(v) syntax descriptor is only used in this specification when the current location in the bitstream is a byte-aligned location.

tu(v): truncated unary using up to maxVal bits with maxVal defined in the semantics of the symtax element.

u(n): a function of decoding the syntax element coded with an unsigned integer using n bits. When n is "v" in the syntax table, the number of bits varies in a manner dependent on the value of other syntax elements. The parsing process for this descriptor is specified by the return value of the function read_bits (n) interpreted as a binary representation of an unsigned integer with most significant bit written first.

ue(v): a function of decoding an unsigned integer 0-th order Exp-Golomb-coded syntax element with the left bit first. The parsing process for this descriptor is specified with the order k equal to 0.

In this regard, according to the conventional exemplary embodiment, the picture header may include the syntaxes expressed in Table 2 below. The syntaxes expressed in Table 2 below may be a part of the picture header.

TABLE 2

| picture_header_structure( ) { | Descriptor |
|---|---|
| gdr_or_irap_pic_flag | u(1) |
| if( gdr_or_irap_pic_flag ) | |
| gdr_pic_flag | u(1) |
| ph_inter_slice_allowed_flag | u(1) |
| if( ph_inter_slice_allowed_flag ) | |
| ph_intra_slice_allowed_flag | u(1) |
| non_reference_picture_flag | u(1) |
| ph_pic_parameter_set_id | ue(v) |
| ... | |
| } | |

Here, the semantics of the syntax elements included in the syntaxes expressed in Table 2 may be, for example, represented as expressed in Table 3 below.

TABLE 3 gdr_or_irap_pic_flag equal to 1 specifies that the current picture is a GDR or IRAP picture. gdr_or_irap_pic_flag equal to 0 specifies that the current picture is not a GDR picture and might or might not be an IRAP picture.
gdr_pic_flag equal to 1 specifies the picture associated with the PH is a GDR picture. gdr_pic_flag equal to 0 specifies that the picture associated with the PH is not a GDR picture. When not present, the value of gdr_pic_flag is inferred to be equal to 0. When gdr_enabled_flag is equal to 0, the value of gdr_pic_flag shall be equal to 0.
ph_inter_slice_allowed_flag equal to 0 specifies that all coded slices of the picture have sh_slice_type equal to 2. ph_inter_slice_allowed_flag equal to 1 specifies that there might or might not be one or more coded slices in the picture that have sh_slice_type equal to 0 or 1.
ph_intra_slice_allowed_flag equal to 0 specifies that all coded slices of the picture have sh_slice_type equal to 0 or 1. ph_intra_slice_allowed_flag equal to 1 specifies that there might or might not be one or more coded slices in the picture that have sh_slice_type equal to 2. When not present, the value of ph_intra_slice_allowed_flag is inferred to be equal to 1.
non_reference_picture_flag equal to 1 specifies the picture associated with the PH is never used as a reference picture. non_reference_picture_flag equal to 0 specifies the picture associated with the PH may or may not be used as a reference picture.
ph_pic_parameter_set_id specifies the value of pps_pic_parameter_set_id for the PPS in use. The value of ph_pic_parameter_set_id shall be in the range of 0 to 63, inclusive.

According to the conventional exemplary embodiment, the image information acquired through the bitstream may include the picture header, and the picture header may include the GDR_or_IRAP picture flag, the GDR picture flag, the inter slice allowed flag, the intra slice allowed flag, the non-reference picture flag, and the picture parameter set ID information.

Here, for example, the GDR_or_IRAP picture flag may be related to whether the current picture is a gradual decoding refresh (GDR) picture or an intra random access point (IRAP) picture. In other words, the GDR_or_IRAP picture flag may indicate/represent whether the current picture is the GDR picture or the IRAP picture.

As an example, the GDR_or_IRAP picture flag may be represented in the form of the gdr_or_irap_pic_flag syntax element. For example, the gdr_or_irap_pic_flag syntax element may specify whether the current picture is the GDR picture or the IRAP picture.

For example, the GDR picture flag may be related to whether the picture related to the picture header is the GDR picture. In other words, the GDR picture flag may indicate/represent whether the current picture is the GDR picture.

As an example, the GDR picture flag may be represented in the form of the gdr_pic_flag syntax element. For example, the gdr_pic_flag syntax element may specify whether the current picture is the GDR picture.

For example, the inter slice allowed flag may be related to whether at least one slice in the current picture is a P slice or a B slice. In other words, the inter slice allowed flag may indicate/represent whether at least one slice in the current picture is the P slice or the B slice.

As an example, the inter slice allowed flag may be represented in the form of the ph_inter_slice_allowed_flag syntax element. For example, the ph_inter_slice_allowed_flag syntax element may specify whether at least one slice in the current picture is the P slice or the B slice.

For example, the intra slice allowed flag may be related to whether at least one slice in the current picture is an I slice. In other words, the intra slice allowed flag may indicate/represent whether at least one slice in the current picture is the I slice.

As an example, the intra slice allowed flag may be represented in the form of the ph_intra_slice_allowed_flag syntax element. For example, the ph_intra_slice_allowed_flag syntax element may specify whether at least one slice in the current picture is the I slice.

For example, the non-reference picture flag may be related to whether the picture related to the picture header is not used as the reference picture. In other words, the non-reference picture flag may indicate/represent whether the current picture is not used as the reference picture.

As an example, the non-reference picture flag may be represented in the form of the non_reference_picture_flag syntax element. For example, the non_reference_picture_flag syntax element may specify whether the current picture is not used as the reference picture.

For example, the picture parameter set ID information may be related to the identification of the picture parameter set in use. In other word, the picture parameter set ID information may indicate/represent the identification of the picture parameter set in use.

As an example, the picture parameter set ID information may be represented in the form of the ph_pic_parameter_set_id syntax element. For example, the ph_pic_parameter_set_id syntax element may specify the identification of the picture parameter set in use.

According to the conventional exemplary embodiment, for example, the GDR_or_IRAP picture flag may be constituted/included in a first location relative to the starting point of the picture header in the picture header.

For example, if a value of the GDR_or_IRAP picture flag is 1, the GDR picture flag may be constituted/included in a location immediately following the location in which the GDR_or_IRAP picture flag is included in the picture header. If the value of the GDR_or_IRAP picture flag is 0, the GDR picture flag may not exist. If the GDR picture flag does not exist, the value of the GDR picture flag may be derived as 0. In this regard, if the value of the GDR enabled flag related to whether the GDR is enabled is 0, the value of the GDR picture flag may be limited to 0. At this time, for example, the GDR enabled flag may be represented in the form of the gdr_enabled_flag syntax element.

For example, if the value of the GDR_or_IRAP picture flag is 1, the inter slice allowed flag may be constituted/included in a location immediately following the location in which the GDR picture flag is included in the picture header. If the value of the GDR_or_IRAP picture flag is 0, the inter slice allowed flag may be constituted/included in a location immediately following the location in which the GDR_or_IRAP picture flag is included in the picture header.

For example, if the value of the inter slice allowed flag is 1, the intra slice allowed flag may be constituted/included in a location immediately following the location in which the inter slice allowed flag is included in the picture header. If the value of the inter slice allowed flag is 0, the intra slice allowed flag may not exist. If the intra slice allowed flag does not exist, the value of the intra slice allowed flag may be derived as 1.

For example, if the value of the inter slice allowed flag is 1, the non-reference picture flag may be constituted/included in a location immediately following the location in which the intra slice allowed flag is included in the picture header. If the value of the inter slice allowed flag is 0, the non-reference picture flag may be constituted/included in a location immediately following the location in which the inter slice allowed flag is included in the picture header.

For example, the picture parameter set ID information may be constituted/included in a location immediately following the location in which the non-reference picture flag is included in the picture header. At this time, for example, the picture parameter set ID information may be coded based on the descriptor ue(v).

However, according to the conventional exemplary embodiment, a signaling mechanism of the syntax elements in the picture header includes the following problems.

First, according to the conventional exemplary embodiment, the descriptor of a pps_pic_parameter_set_id syntax element related to the picture parameter set ID information signaled in the PPS may be u(6) other than the ue(v). However, according to the current VVC standard, there is a problem in that the pps_pic_parameter_set_id syntax element is still referenced by the ph_pic_parameter_set_id syntax element coded with the ue(v) in the picture header even when coded with the u(6) in the PPS. At this time, for example, the ph_pic_parameter_set_id syntax element may be related to the picture parameter set ID information signaled in the picture header.

Second, the non_reference_picture_flag syntax element related to whether the current picture is not used as the reference picture is signaled at a variable location relative to the starting point of the picture header in the picture header, and since the non_reference_picture_flag syntax element is a syntax element for helping the decoding process and the system function, it may be preferably signaled at the fixed location of the picture header. Further, considering that the pps_pic_parameter_set_id syntax element is changed to be signaled based on the descriptor coded at a fixed length, the ph_pic_parameter_set_id syntax element may also be preferably signaled at the fixed location relative to the starting point of the picture header.

In this regard, the exemplary embodiments of the present document may include one or more of the following features.

1) The coding of the syntax element (e.g., the ph_pic_parameter_set_id syntax element) indicating a reference PPS ID included in the picture header may be limited such that the syntax element is coded based on the fixed length (e.g., the descriptor of the u(6)).

2) In the picture header, the location of the non_reference_picture_flag syntax element may be moved to always exist at the fixed location from the starting point of the picture header, and the fixed location may not be affected by values of other syntax elements.

3) In the picture header, the location of the ph_pic_parameter_set_id syntax element may be always moved to the fixed location from the starting point of the picture header, and the fixed location may not be affected by the values of other syntax elements.

Alternatively, in the picture header, the location of the ph_pic_parameter_set_id syntax element may be moved to a fixed bit location immediately following the signaling location of the gdr_pic_flag syntax element indicating whether the picture related to the picture header is the GDR picture.

4) In the 3), an existence condition of the gdr_pic_flag syntax element indicating whether the picture related to the picture header is the GDR picture may be based on a value of the gdr_enabled_flag syntax element indicating whether the GDR is enabled.

According to a first exemplary embodiment proposed by the present document, the picture header may include syntaxes expressed in Table 4 below. The syntaxes expressed in Table 4 below may be a part of the picture header.

TABLE 4

| picture_header_structure( ) { | Descriptor |
| --- | --- |
| gdr_of_irap_pic_flag | u(1) |
| non_reference_picture_flag | u(1) |
| ph_pic_parameter_set_id | u(6) |
| if( gdr_of_irsp_pic_flag ) | |
| gdr_pic_flag | u(1) |
| ph_inter_slice_allowed_flag | u(1) |
| if( ph_inter_slice_allowed_flag ) | |
| ph_intra_slice_allowed_flag | u(1) |
| ... | |

Here, the semantics of the syntax elements included in the syntaxes expressed in Table 4 may be, for example, represented as expressed in Table 3.

According to the first exemplary embodiment, the image information acquired through the bitstream may include the picture header, and the picture header may include the GDR_or_IRAP picture flag, the non-reference picture flag, the picture parameter set ID information, the GDR picture flag, the inter slice allowed flag, and the intra slice allowed flag.

According to the first exemplary embodiment, for example, the GDR_or_IRAP picture flag may be constituted/included in the first location relative to the starting point of the picture header in the picture header. As an example, the non-reference picture flag may be constituted/included in the first location, which is the fixed location relative to the starting point of the picture header in the picture header. As an example, the first location as the fixed location may not be affected by a value of the information included in the picture header.

For example, the non-reference picture flag may be constituted/included in a fixed first location relative to the starting point of the picture header in the picture header. As an example, the first location as the fixed location may not be affected by the value of the information included in the picture header. As an example, the non-reference picture flag may be included in the first location of the picture header regardless of whether the GDR picture flag is included in the picture header.

As an example, the non-reference picture flag may be constituted/included in a location immediately following the location (first location) in which the GDR_or_IRAP picture flag is included in the picture header. In other words, the first location may be a location immediately following the location in which the GDR_or_IRAP picture flag is included in the picture header.

For example, the picture parameter set ID information may be constituted/included in a fixed second location relative to the starting point of the picture header in the picture header. As an example, the second location may not be affected by the value of the information included in the picture header. As an example, the picture parameter set ID information may be included in the second location of the picture header regardless of whether the GDR picture flag is included in the picture header.

As an example, the picture parameter set ID information may be constituted/included in a location immediately following the location in which the non-reference picture flag is included in the picture header. In other words, the second location may be a location immediately following the first location in the picture header. At this time, for example, the picture parameter set ID information may be coded based on the descriptor u(6). As an example, the picture parameter set ID information may be coded based on an unsigned integer using 6 bits. In other words, the picture parameter set ID information may not be coded based on the descriptor ue(v).

For example, if the value of the GDR_or_IRAP picture flag is 1, the GDR picture flag may be constituted/included in a location immediately following the location (second location) in which the picture parameter set ID information is included in the picture header. If the value of the GDR_or_IRAP picture flag is 0, the GDR picture flag may not exist. If the GDR picture flag does not exist, the value of the GDR picture flag may be derived as 0. In this regard, if the value of the GDR enabled flag related to whether the GDR is enabled is 0, the value of the GDR picture flag may be limited to 0. At this time, for example, the GDR enabled flag may be represented in the form of the gdr_enabled_flag syntax element.

For example, if the value of the GDR_or_IRAP picture flag is 1, the inter slice allowed flag may be constituted/included in a location immediately following the location in which the GDR picture flag is included in the picture header. If the value of the GDR_or_IRAP picture flag is 0, the inter slice allowed flag may be constituted/included in the location immediately following the location (second location) in which the picture parameter set ID information is included in the picture header. In other words, the inter slice allowed flag may be constituted/included in a variable location according to the value of the GDR_or_IRAP picture flag in the picture header.

For example, if the value of the inter slice allowed flag is 1, the intra slice allowed flag may be constituted/included in the position immediately following a location in which the inter slice allowed flag is included in the picture header. If the value of the inter slice allowed flag is 0, the intra slice allowed flag may not exist. If the intra slice allowed flag does not exist, the value of the intra slice allowed flag may be derived as 1. In other words, the intra slice allowed flag may be constituted/included in the variable location according to the value of the GDR_or_IRAP picture flag and the value of the inter slice allowed flag in the picture header.

According to the first exemplary embodiment, since the non-reference picture flag and the picture parameter set ID information exist at locations prior to the location in which the GDR picture flag is included, they may not be constituted/included in the variable location according to the value of the GDR_or_IRAP picture flag and/or the value of the inter slice allowed flag in the picture header.

In other words, according to the first exemplary embodiment, the non-reference picture flag and the picture parameter set ID information may be signaled at the fixed locations relative to the starting point of the picture header, and the picture parameter set ID information may be coded based on the descriptor u(6). As a result, it is possible to improve accessibility to the bitstreams (e.g., information included in the picture headers) of other devices other than the decoding apparatus, and to achieve the improvement in the decoding process and the system function.

According to a second exemplary embodiment proposed by the present document, the picture header may include syntaxes expressed in Table 5 below. The syntaxes expressed in Table 5 below may be a part of the PPS.

TABLE 5

| picture_header_structure( ) { | Descriptor |
| --- | --- |
| gdr_or_irap_pic_flag | u(1) |
| non_reference_picture_flag | u(1) |
| ph_pic_parameter_set_id | u(6) |
| if( gdr_of_irap_pic_flag && gdr_enabled_flag ) | |
| gdr_pic_flag | u(1) |
| ph_inter_slice_allowed_flag | u(1) |
| if( ph_inter_slice_allowed_flag ) | |
| ph_intra_slice_allowed_flag | u(1) |
| ... | |
| } | |

Here, the semantics of the syntax elements included in syntaxes expressed in Table 5 may be, for example, represented as expressed in Table 6 below or Table 3.

TABLE 6 gdr_pic_flag equal to 1 specifies the picture associated with the PH is a GDR picture.
gdr_pic_flag equal to 0 specifies that the picture associated with the PH is not a GDR picture.
When not present, the value of gdr_pic_flag is inferred to be equal to 0.

According to the second exemplary embodiment, as described above in the first exemplary embodiment, the picture header may include the GDR_or_IRAP picture flag, the non-reference picture flag, the picture parameter set ID information, the GDR picture flag, the inter slice allowed flag, and the intra slice allowed flag.

According to the second exemplary embodiment, as described above in the first exemplary embodiment, the GDR_or_IRAP picture flag may be constituted/included in the first location relative to the starting point of the picture header in the picture header.

For example, as described above in the first exemplary embodiment, the non-reference picture flag may be constituted/included in the fixed first location relative to the starting point of the picture header in the picture header. As an example, the non-reference picture flag may be constituted/included in the location immediately following the location (first location) in which the GDR_or_IRAP picture flag is included in the picture header. In other words, the first location may be a location immediately following the location in which the GDR_or_IRAP picture flag is included in the picture header.

For example, as described above in the first exemplary embodiment, the picture parameter set ID information may be constituted/included in the fixed second location relative to the starting point of the picture header in the picture header. As an example, the picture parameter set ID information may be constituted/included in the location immediately following the location in which the non-reference picture flag is included in the picture header. In other words, the second location may be a location immediately following the first location in the picture header. At this time, for example, the picture parameter set ID information may be coded based on the descriptor u(6). As an example, the picture parameter set ID information may be coded based on an unsigned integer using 6 bits.

For example, as described above in the first exemplary embodiment, if the value of the GDR_or_IRAP picture flag is 1, the GDR picture flag may be constituted/included in the location immediately following the location (second location) in which the picture parameter set ID information is included in the picture header. If the value of the GDR_or_IRAP picture flag is 0, the GDR picture flag may not exist. If the GDR picture flag does not exist, the value of the GDR picture flag may be derived as 0.

Further, according to the second exemplary embodiment, for example, if the value of the GDR enabled flag related to whether the GDR is enabled is 1, the GDR picture flag may be constituted/included in the location immediately following the location (second location) in which the picture parameter set ID information is included in the picture header. If the value of the GDR enabled flag is 0, the GDR picture flag may not exist. If the GDR picture flag does not exist, the value of the GDR picture flag may be derived as 0. At this time, for example, the GDR enabled flag may be represented in the form of the gdr_enabled_flag syntax element.

For example, if the value of the GDR_or_IRAP picture flag is 1 and the value of the GDR_enabled_flag is 1, the inter slice allowed flag may be constituted/included in the location immediately following the location in which the GDR picture flag is included in the picture header. If the value of the GDR_or_IRAP picture flag is 0 or the value of the GDR enabled flag is 0, the inter slice allowed flag may be constituted/included in the location immediately following the location (second location) in which the picture parameter set ID information is included in the picture header. In other words, the inter slice allowed flag may be constituted/included in the variable location according to the value of the GDR_or_IRAP picture flag and the value of the GDR enabled flag in the picture header.

For example, if the value of the inter slice allowed flag is 1, the intra slice allowed flag may be constituted/included in the location immediately following the location in which the inter slice allowed flag is included in the picture header. If the value of the inter slice allowed flag is 0, the intra slice allowed flag may not exist. If the intra slice allowed flag does not exist, the value of the intra slice allowed flag may be derived as 1. In other words, the intra slice allowed flag may be constituted/included in the variable location according to the value of the GDR_or_IRAP picture flag, the value of the GDR enabled flag, and the value of the inter slice allowed flag in the picture header.

According to the second exemplary embodiment, since the non-reference picture flag and the picture parameter set ID information exist at the locations prior to the location in which the GDR picture flag is included in the picture header, they may not be constituted/included in the variable location according to the value of the GDR_or_IRAP picture flag and/or the value of the inter slice allowed flag in the picture header. Further, the GDR picture flag may be constituted/included in the picture header based on the value of the GDR enabled flag.

In other words, according to the second exemplary embodiment, the non-reference picture flag and the picture parameter set ID information may be signaled at the fixed locations relative to the starting point of the picture header. The picture parameter set ID information may be coded based on the descriptor u(6), and the GDR picture flag may be signaled in the picture header based on the GDR enabled flag. As a result, it is possible to improve the accessibility to the bitstreams (e.g., information included in the picture headers) of other devices other than the decoding apparatus, and to achieve the improvement in the decoding process and the system function.

According to a third exemplary embodiment proposed by the present document, the picture header may include syntaxes expressed in Table 7 below. The syntaxes expressed in Table 7 below may be a part of the picture header.

TABLE 7

| | Descriptor |
|---|---|
| picture_header_structure( ) { | |
| gdr_or_irap_pic_flag | u(1) |
| non_reference_picture_flag | u(1) |
| if( gdr_or_iran_pic_flag ) | |
| gdr_pic_flag | u(1) |
| ph_pic_parameter_set_id | u(6) |

TABLE 7-continued

| | |
|---|---|
| ph_inter_slice_allowed_flag | u(1) |
| if( ph_inter_slice_allowed_flag ) | |
|     ph_intra_slice_allowed_flag | u(1) |
| ... | |
| } | |

Here, the semantics of the syntax elements included in the syntaxes expressed in Table 7 may be, for example, represented as expressed in Table 3.

According to the third exemplary embodiment, as described above in the first exemplary embodiment or the second exemplary embodiment, the picture header may include the GDR_or_IRAP picture flag, the non-reference picture flag, the GDR picture flag, the picture parameter set ID information, the inter slice allowed flag, and the intra slice allowed flag.

According to the third exemplary embodiment, for example, the GDR_or_IRAP picture flag may be constituted/included in the first location relative to the starting point of the picture header in the picture header. As an example, the non-reference picture flag may be constituted/included in the first location, which is a fixed location relative to the starting point of the picture header in the picture header. As an example, the first location as the fixed location may not be affected by the value of the information included in the picture header.

For example, the non-reference picture flag may be constituted/included in the fixed first location relative to the starting point of the picture header in the picture header. As an example, the first location as the fixed location may not be affected by the value of the information included in the picture header. As an example, the non-reference picture flag may be included in the first location of the picture header regardless of whether the GDR picture flag is included in the picture header.

As an example, the non-reference picture flag may be constituted/included in the location immediately following the location (first location) in which the GDR_or_IRAP picture flag is included in the picture header. In other words, the first location may be a location immediately following the location in which the GDR_or_IRAP picture flag is included in the picture header.

For example, if the value of the GDR_or_IRAP picture flag is 1, the GDR picture flag may be constituted/included in the location immediately following the location in which the non-reference picture flag is included in the picture header. If the value of the GDR_or_IRAP picture flag is 0, the GDR picture flag may not exist. If the GDR picture flag does not exist, the value of the GDR picture flag may be derived as 0. In this regard, if the value of the GDR enabled flag related to whether the GDR is enabled is 0, the value of the GDR picture flag may be limited to 0. At this time, for example, the GDR enabled flag may be represented in the form of the gdr_enabled_flag syntax element.

According to the third exemplary embodiment, for example, the non-reference picture flag may exist at the first location which is between the location in which the GDR_or_IRAP picture flag is included and the location in which the GDR picture flag is included in the picture header based on the case where the value of the GDR_or_IRAP picture flag is 1.

For example, according to the third exemplary embodiment, if the value of the GDR_or_IRAP picture flag is 1, the picture parameter set ID information may be constituted/included in the location immediately following the location in which the GDR picture flag is included in the picture header. If the value of the GDR_or_IRAP picture flag is 0, the picture parameter set ID information may be constituted/included in the location immediately following the location in which the non-reference picture flag is included in the picture header. In other words, the picture parameter set ID information may be constituted/included in the variable location according to the value of the GDR_or_IRAP picture flag in the picture header. At this time, for example, the picture parameter set ID information may be coded based on the descriptor u(6). As an example, the picture parameter set ID information may be coded based on the unsigned integer using 6 bits. In other words, the picture parameter set ID information may not be coded based on the descriptor ue(v).

For example, the inter slice allowed flag may be constituted/included in the location immediately following the location in which the picture parameter set ID information is included in the picture header. Likewise, for example, the inter slice allowed flag may be constituted/included in the variable location according to the value of the GDR_or_IRAP picture flag in the picture header.

For example, if a value of the inter slice allowed flag is 1, the intra slice allowed flag may be constituted/included in the location immediately following the location in which the inter slice allowed flag is included in the picture header. If the value of the inter slice allowed flag is 0, the intra slice allowed flag may not exist. If the intra slice allowed flag does not exist, a value of the intra slice allowed flag may be derived as 1. In other words, the intra slice allowed flag may be constituted/included in the variable location according to the value of the GDR_or_IRAP picture flag and the value of the inter slice allowed flag in the picture header.

According to the third exemplary embodiment, since the non-reference picture flag exists at the location prior to the location in which the GDR picture flag is included in the picture header, it may not be constituted/included in the variable location according to the value of the GDR_or_IRAP picture flag and/or the value of the inter slice allowed flag in the picture header.

Further, according to the third exemplary embodiment, since the picture parameter set ID information exists at the location prior to the location in which the intra slice allowed flag is included in the picture header, it may not be constituted/included in the variable location according to the value of the inter slice allowed flag in the picture header.

In other words, according to the third exemplary embodiment, the non-reference picture flag may be signaled at the fixed location relative to the starting point of the picture header, and the picture parameter set ID information may be coded based on the descriptor u(6). As a result, it is possible to improve the accessibility to the bitstreams (e.g. information included in the picture headers) of other devices other than the decoding apparatus and to achieve the improvement in the decoding process and the system function.

The following drawings are illustrated for explaining specific examples of the present specification. Since names of specific devices or names of specific signals/messages/fields illustrated in the drawings are exemplarily presented, the technical features of the present specification are not limited to specific names used in the following drawings.

Figure 9:
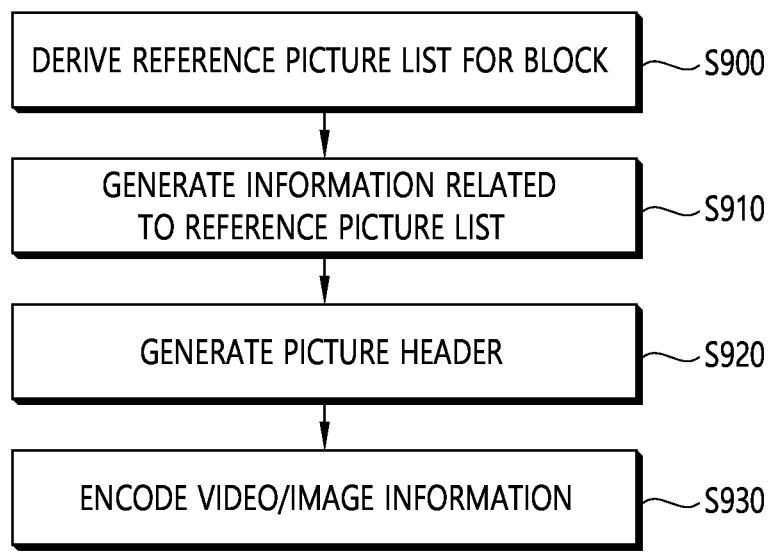
FIGS. 9 and 10 schematically illustrate examples of the video/image encoding method according to the exemplary embodiment(s) of the present document and related components.
Figure 10:
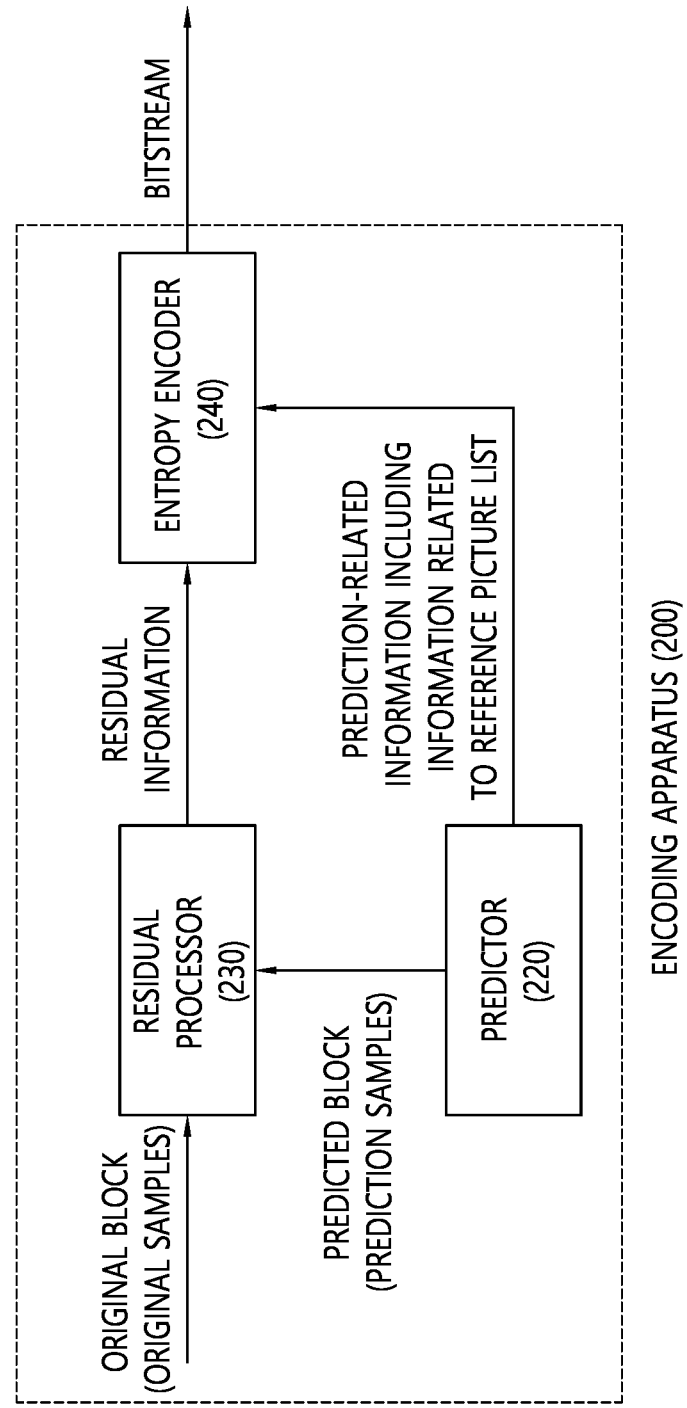

FIGS. 9 and 10 schematically illustrate examples of a video/image encoding method and related components according to the exemplary embodiment(s) of the present document. A method illustrated in FIG. 9 may be performed by the encoding apparatus illustrated in FIG. 2. Specifically, for example, S900 and S910 illustrated in FIG. 9 may be performed by the predictor 220 of the encoding apparatus 200, and S920 and S930 illustrated in FIG. 9 may be performed by the entropy encoder 240 of the encoding apparatus 200. The method illustrated in FIG. 9 may include the aforementioned exemplary embodiments in the present document.

Referring to FIG. 9, the encoding apparatus derives a reference picture list for a current block (S900). The encoding apparatus generates information related to the reference picture list (S910). For example, the encoding apparatus may generate information related to the reference picture list based on the reference picture list.

For example, the information related to the reference picture list may include a ref_pic_lists field, and the information related to the reference picture list may be constituted/included in a picture header or a slice header and delivered. The information related to the reference picture list may include information used for deriving the reference picture list. For example, the information related to the reference picture list may include at least one of information related to a reference picture list index, information related to a long-term reference picture, and/or information related to a short-term reference picture. The information related to the long-term reference picture may include information about a picture order count (POC) of the long-term reference picture. The information related to the short-term reference picture may include information about an $i^{th}$ delta POC of the short-term reference picture, and the delta POC may be derived based on a $(i-1)^{th}$ POC.

The video/image information may include a high level syntax (HLS), and the HLS may include the information related to the reference picture list. For example, the HLS may further include information representing whether the information related to the reference picture list is included in/signaled to the picture header or the slice header. As an example, if the information related to the reference picture list is included in/signaled to the picture header, the same reference picture list may be used for the inter prediction with respect to blocks including different slices in the picture referring to the picture header. As another example, if the information related to the reference picture list is included in/signaled to the slice header, different reference picture lists may be used for different slices in the same picture. In other words, for example, the picture may include a first slice and a second slice, the information related to a first reference picture list may be included in/signaled to the slice header for the first slice, and information related to a second reference picture list may be included in/signaled to the slice header for the second slice. At this time, the first reference picture list may be derived for predicting a block in the first slice, and the second reference picture list may be derived for predicting a block in the second slice. In other words, even if the first slice and the second slice exist in the same picture, the first reference picture list and the second reference picture list may be different from each other.

The encoding apparatus generates the picture header (S920). For example, the encoding apparatus may generate the picture header including the information related to the reference picture list. For example, the picture header may include at least one of a GDR_or_IRAP picture flag, a GDR picture flag, an inter slice allowed flag, an intra slice allowed flag, a non-reference picture flag, picture parameter set ID information, and/or a GDR enabled flag. For example, the picture header may include at least one of gdr_or_irap_pic_flag, gdr_pic_flag, ph_inter_slice_allowed_flag, ph_intra_slice_allowed_flag, non_reference_picture_flag, ph_pic_parameter_set_id, and/or gdr_enabled_flag syntax elements.

In this regard, as described above, the encoding apparatus may perform the inter prediction based on the picture header in which the information related to the reference picture list is included, thereby deriving prediction samples for the current block. Further, the encoding apparatus may derive residual samples based on the prediction samples. For example, the encoding apparatus may derive the residual samples through a comparison between original samples and the prediction samples of the current block. Further, the encoding apparatus may generate residual information based on the residual samples, and additionally generate a residual sample for an already reconstructed sample.

The encoding apparatus encodes the video/image information (S930). For example, the video/image information may include the picture header. As an example, the video/image information may include the picture header in which the information related to the reference picture list is included.

Further, the video/image information may include various information according to the exemplary embodiments of the present document. For example, the video/image information may include the information disclosed in at least one of Tables 2, 4, 5, and/or 7 described above.

Meanwhile, the video/image information may include prediction information and residual information. The prediction information as information related to the prediction procedure may include information about prediction mode information (e.g., a skip flag, a merge flag, or a mode index) and motion information. The information about the motion information may include candidate selection information (e.g., a merge index, an mvp flag or an mvp index), which is information for deriving a motion vector. Further, the information about the motion information may include the aforementioned information about the MVD and/or reference picture index information. Further, the information about the motion information may include information representing whether L0 prediction, L1 prediction, or Bi prediction is applied. The residual information is information about the residual samples. The residual information may include information about quantized transform coefficients for the residual samples.

The encoded video/image information may be output in the form of a bitstream. The bitstream may be transmitted to the decoding apparatus through a network or a storage medium.

Further, as described above, the encoding apparatus may generate a reconstructed picture (including reconstructed samples and reconstructed block) based on the reference samples and the residual samples. This is to derive the same prediction result as that obtained by being performed by the decoding apparatus in the encoding apparatus, and as a result, it is possible to enhance coding efficiency. Therefore, the encoding apparatus may store the reconstructed picture (or the reconstructed samples and the reconstructed block) in a memory and use the reconstructed picture as a reference picture for the inter prediction. As described above, the in-loop filtering procedure or the like may be further applied to the reconstructed picture.

Specifically, the picture header may include various information according to the exemplary embodiments of the present document.

According to the exemplary embodiment proposed by the present document, the picture header may include the non-reference picture flag related to whether the current picture is not used as the reference picture. For example, the non-reference picture flag may be included in the fixed first location relative to the starting point of the picture header in the picture header.

At this time, according to the exemplary embodiment, the first location may not be affected by a value of the information included in the picture header.

Further, according to the exemplary embodiment, the picture header may further include a GDR_or_IRAP picture flag related to whether the current picture is a gradual decoding refresh (GDR) picture or an intra random access point (IRAP) picture. For example, the first location may be a location immediately following the location in which the GDR_or_IRAP picture flag is included in the picture header.

At this time, according to the exemplary embodiment, the picture header may further include a GDR picture flag related to whether the current picture is the GDR picture. For example, the GDR picture flag may be included in the picture header based on a case where a value of the GDR_or_IRAP picture flag is 1. As an example, the non-reference picture flag may be included in the first location of the picture header regardless of whether the GDR picture flag is included in the picture header.

Here, according to the exemplary embodiment, the non-reference picture flag may be included in the first location which is between a location in which the GDR_or_IRAP picture flag is included and a location in which the GDR picture flag is included in the picture header based on the case where the value of the GDR_or_IRAP picture flag is 1.

Further, according to the exemplary embodiment, the picture header may further include picture parameter set ID information related to the identification of a picture parameter set in use. For example, the picture parameter set ID information may be included in the fixed second location relative to the starting point of the picture header in the picture header. As an example, the second location may not be affected by the value of the information included in the picture header.

At this time, according to the exemplary embodiment, the second location may be a location immediately following the first location in the picture header. For example, the picture parameter set ID information may be included in the second location of the picture header regardless of whether the GDR picture flag is included in the picture header.

Further, according to the exemplary embodiment, the picture parameter set ID information may be coded based on a descriptor u(6). As an example, the picture parameter set ID information may be coded based on an unsigned integer using 6 bits.

According to the exemplary embodiment, the picture header may further include the picture parameter set ID information related to the identification of the picture parameter set in use. For example, the picture parameter set ID information may be included in the location immediately following the location in which the GDR picture flag is included in the picture header based on a case where the GDR picture flag is included in the picture header. As an example, the picture parameter set ID information may be included in the location immediately following the first location in the picture header based on a case where the GDR picture flag is not included in the picture header.

Further, according to the exemplary embodiment, the GDR picture flag may be included in the picture header based on a case where the value of the GDR enabled flag related to whether the GDR is enabled is 1.

Further, according to the exemplary embodiment, the value of the GDR picture flag may be derived as 0 based on a case where the GDR picture flag does not exist in the picture header.

Figure 11:
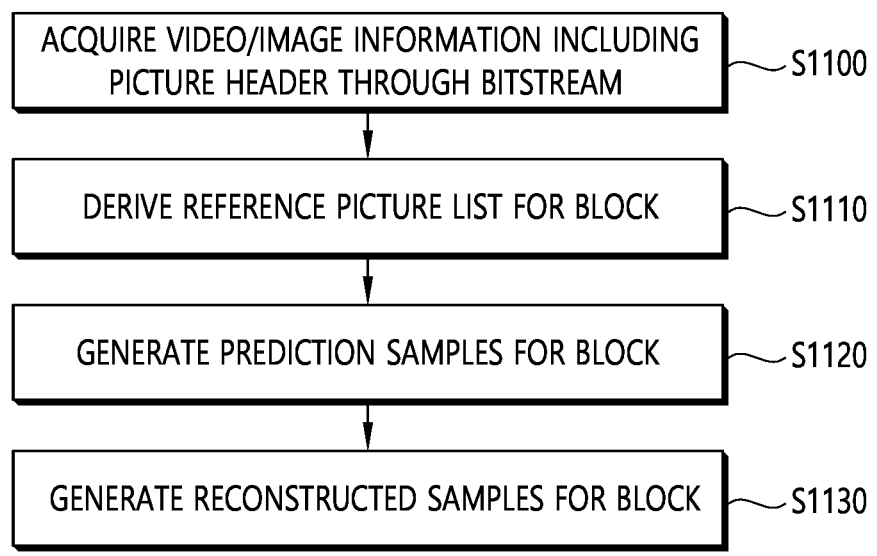
FIGS. 11 and 12 schematically illustrate examples of the video/image decoding method according to the exemplary embodiment of the present document and related components.
Figure 12:
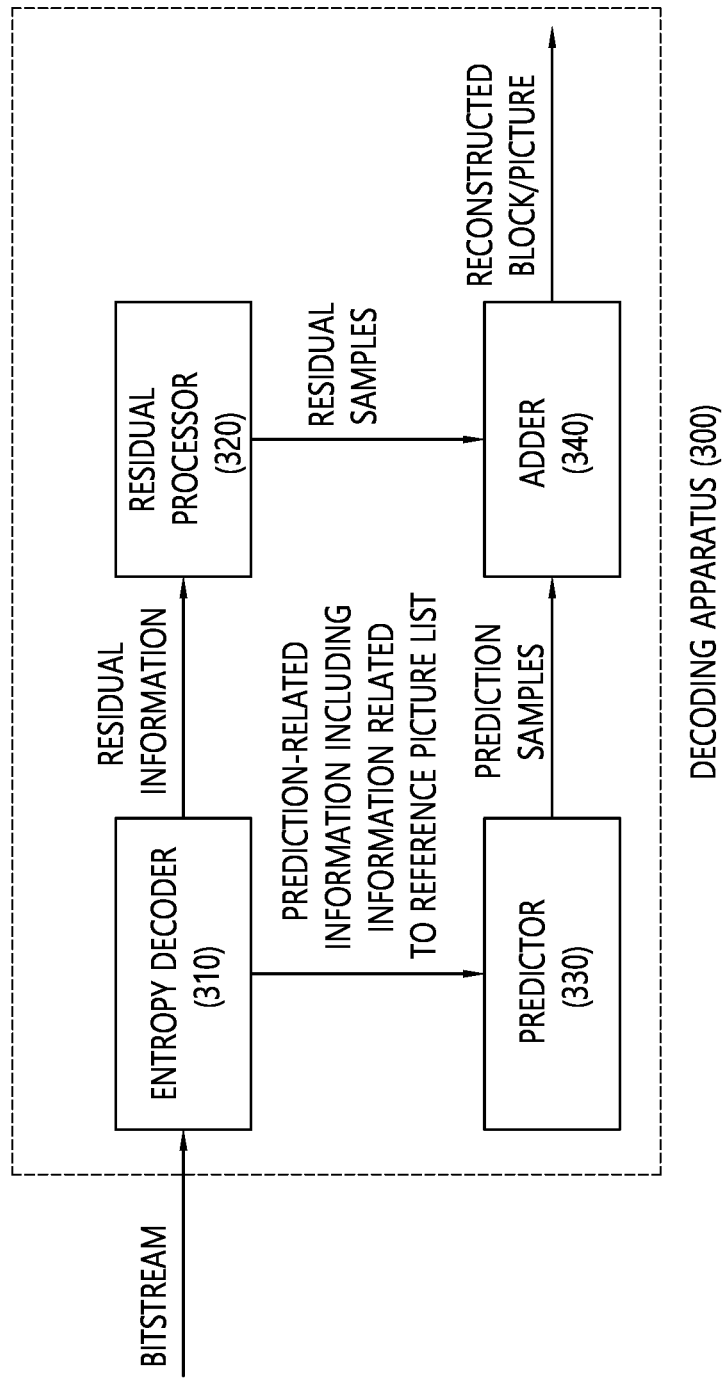

FIGS. 11 and 12 schematically illustrate examples of a video/image decoding method and related components according to the exemplary embodiment of the present document. A method illustrated in FIG. 11 may be performed by the decoding apparatus illustrated in FIG. 3. Specifically, for example, S1100 illustrated in FIG. 11 may be performed by the entropy decoder 310 of the decoding apparatus 300, S1110 and S1120 may be performed by the predictor 330 of the decoding apparatus 300, and S1130 may be performed by the adder 340 of the decoding apparatus 300. The method illustrated in FIG. 11 may include the aforementioned exemplary embodiments in the present document.

Referring to FIG. 11, the decoding apparatus receives/acquires video/image information (S1100). For example, the decoding apparatus may receive/acquire the video/image information through a bitstream. As an example, the decoding apparatus may receive/acquire the video/image information through the bitstream, and the video/image information may include the picture header.

For example, the picture header may include at least one of the GDR_or_IRAP picture flag, the GDR picture flag, the inter slice allowed flag, the intra slice allowed flag, the non-reference picture flag, the picture parameter set ID information, and/or the GDR enabled flag. For example, the picture header may include at least one of gdr_or_irap_pic_flag, gdr_pic_flag, ph_inter_slice_allowed_flag, ph_intra_slice_allowed_flag, non_reference_picture_flag, ph_pic_parameter_set_id, and/or gdr_enabled_flag syntax elements.

Further, the video/image information may include various information according to the exemplary embodiments of the present document. For example, the video/image information may include information disclosed in at least one of Tables 2, 4, 5, and/or 7 described above.

Meanwhile, for example, the video/image information may include prediction information and residual information. The prediction information as information related to the prediction procedure may include information about prediction mode information (e.g., a skip flag, a merge flag, or a mode index) and motion information. The information about the motion information may include candidate selection information (e.g., a merge index, an mvp flag, or an mvp index), which is information for deriving a motion vector. Further, the information about the motion information may include the aforementioned information about the MVD and/or reference picture index information. Further, the information about the motion information may include information representing whether L0 prediction, L1 prediction, or Bi prediction is applied. The residual information is information about the residual samples. The residual information may include information about quantized transform coefficients for the residual samples.

The decoding apparatus derives the reference picture list for the current block (S1110). For example, the decoding apparatus may derive the reference picture list for the current block based on the picture header included in the video/image information. As an example, the decoding apparatus may derive the reference picture list for the current block based on the information related to the reference picture list in the picture header included in the video/image information.

For example, the information related to the reference picture list may include the ref_pic_lists field, and the information related to the reference picture list may be constituted/included in a picture header or a slice header and delivered. The information related to the reference picture list may include information used for deriving the reference picture list. For example, the information related to the reference picture list may include at least one of the information related to the reference picture list index, the information related to the long-term reference picture, and/or the information related to the short-term reference picture. The information related to the long-term reference picture may include information about a picture order count (POC) of the long-term reference picture. The information related to the short-term reference picture may include the information about the $i^{th}$ delta POC of the short-term reference picture, and the delta POC may be derived based on the $(i-1)^{th}$ POC.

The video/image information may include the high level syntax (HLS), and the HLS may include the information related to the reference picture list. For example, the HLS may further include the information representing whether the information related to the reference picture list is included in/signaled to the picture header or the slice header. As an example, if the information related to the reference picture list is included in/signaled to the picture header, the same reference picture list may be used for the inter prediction with respect to blocks including different slices in the picture referring to the picture header. As another example, if the information related to the reference picture list is included in/signaled to the slice header, different reference picture lists may be used for different slices in the same picture. In other words, for example, the picture may include the first slice and the second slice, the information related to the first reference picture list may be included in/signaled to the slice header for the first slice, and the information related to the second reference picture list may be included in/signaled to the slice header for the second slice. At this time, the first reference picture list may be derived for predicting the block in the first slice, and the second reference picture list may be derived for predicting the block in the second slice. In other words, even if the first slice and the second slice exist in the same picture, the first reference picture list and the second reference picture list may be different from each other.

The decoding apparatus generates the prediction samples for the current block (S1120). For example, the decoding apparatus may generate the prediction samples for the current block based on the reference picture list. As an example, the decoding apparatus may generate the prediction samples for the current block based on the reference picture in the reference picture list. For example, the information related to the reference picture list may include the reference picture index information. The decoding apparatus may derive the reference picture index of the current block based on the reference picture index information. For example, the picture indicated by the reference picture index in the reference picture list for the current block may be derived as the reference picture referenced for the inter prediction of the current block. The decoding apparatus may derive the reference picture based on the reference picture index of the current block and derive the prediction samples of the current block using the samples of the reference block indicated by the motion vector of the current block on the reference picture. In this case, as described above, the prediction sample filtering procedure for all or some of the prediction samples of the current block may be further performed in some cases.

The decoding apparatus generates the reconstructed samples for the current block (S1130). For example, the decoding apparatus may generate the reconstructed samples for the current block based on the prediction samples. Further, for example, the decoding apparatus may generate the reconstructed samples for the current block based on the residual samples and the prediction samples for the current block. The residual samples for the current block may be generated based on the received residual information. Further, as an example, the decoding apparatus may generate the reconstructed picture including the reconstructed samples. Then, as described above, the in-loop filtering procedure or the like may be further applied to the reconstructed picture.

Here, the picture header may include various information according to the exemplary embodiment of the present document.

According to the exemplary embodiment proposed by the present document, the picture header may include the non-reference picture flag related to whether the current picture is not used as the reference picture. For example, the non-reference picture flag may be included in the fixed first location relative to the starting point of the picture header in the picture header.

At this time, according to the exemplary embodiment, the first location may not be affected by the value of the information included in the picture header.

Further, according to the exemplary embodiment, the picture header may further include the GDR_or_IRAP picture flag related to whether the current picture is the gradual decoding refresh (GDR) picture or the intra random access point (IRAP) picture. For example, the first location may be a location immediately following the location in which the GDR_or_IRAP picture flag is included in the picture header.

At this time, according to the exemplary embodiment, the picture header may further include the GDR picture flag related to whether the current picture is the GDR picture. For example, the GDR picture flag may be included in the picture header based on the case where the value of the GDR_or_IRAP picture flag is 1. As an example, the non-reference picture flag may be included in the first location of the picture header regardless of whether the GDR picture flag is included in the picture header.

Here, according to the exemplary embodiment, based on a case where the value of the GDR_or_IRAP picture flag is 1, the non-reference picture flag may be included in the first location which is between the location in which the GDR_or_IRAP picture flag is included and the location in which the GDR picture flag is included in the picture header.

Further, according to the exemplary embodiment, the picture header may further include the picture parameter set ID information related to the identification of the picture parameter set in use. For example, the picture parameter set ID information may be included in the fixed second location relative to the starting point of the picture header in the picture header. As an example, the second location may not be affected by the value of the information included in the picture header.

At this time, according to the exemplary embodiment, the second location may be a location immediately following the first location in the picture header. For example, the picture parameter set ID information may be included in the second location of the picture header regardless of whether the GDR picture flag is included in the picture header.

Further, according to the exemplary embodiment, the picture parameter set ID information may be coded based on the descriptor u(6). As an example, the picture parameter set ID information may be coded based on the unsigned integer using 6 bits.

According to the exemplary embodiment, the picture header may further include the picture parameter set ID information related to the identification of the picture parameter set in use. For example, the picture parameter set ID information may be included in the location immediately following the location in which the GDR picture flag is included in the picture header based on the case where the GDR picture flag is included in the picture header. As an example, the picture parameter set ID information may be included in the location immediately following the first location in the picture header based on the case where the GDR picture flag is not included in the picture header.

Further, according to the exemplary embodiment, the GDR picture flag may be included in the picture header based on the case where the value of the GDR enabled flag related to whether the GDR is enabled is 1.

Further, according to the exemplary embodiment, the value of the GDR picture flag may be derived as 0 based on the case where the GDR picture flag does not exist in the picture header.

In the above-described embodiment, the methods are described based on the flowchart having a series of steps or blocks, but this embodiment is not limited to the order of the above steps or blocks and some steps may occur simultaneously or in a different order from other steps as described above. Further, those skilled in the art will understand that the steps shown in the above flowchart are not exclusive, that further steps may be included, or that one or more steps in the flowchart may be deleted without affecting the scope of the embodiments of the present document.

The method according to the embodiments of the present document described above may be implemented in software. The encoding apparatus and/or decoding apparatus according to the present document may be included in a device that performs image processing, for example, a TV, a computer, a smartphone, a set-top box, or a display device.

When the embodiments of the present document are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include a ROM (read-only memory), a RAM (random access memory), a flash memory, a memory card, a storage medium, and/or other storage device. That is, the embodiments described in the present document may be implemented and performed on a processor, a microprocessor, a controller, or a chip. For example, the functional units shown in each drawing may be implemented and executed on a computer, a processor, a microprocessor, a controller, or a chip. In this case, information (ex. Information on instructions) for implementation or an algorithm may be stored in a digital storage medium.

In addition, the decoding apparatus and the encoding apparatus to which the embodiments of the present document are applied may be applied to multimedia communication devices such as a multimedia broadcasting transmitting and receiving device, a mobile communication terminal, a home cinema video device, a digital cinema video device, a surveillance camera, a video chatting device, (3D) video devices, video telephony video devices, and medical video devices, and the like, which may be included in, for example, a storage medium, a camcorder, a video on demand (VoD) service provision device, an OTT video (Over the top video), an Internet streamlining service providing device, a 3D video device, a virtual reality (VR) device, an augmented reality (AR) device, a video call device, a transportation means terminal (e.g., vehicle (including autonomous vehicle) terminal, airplane terminal, ship terminal, etc.) and may be used to process video signals or data signals. For example, the OTT video (over the top video) device may include a game console, a Blu-ray player, an Internet access TV, a home theater system, a smartphone, a tablet PC, a digital video recorder (DVR).

Further, the processing method to which the embodiments of the present document are applied may be produced in the form of a computer-executed program, and may be stored in a computer-readable recording medium. The multimedia data having the data structure according to the embodiment(s) of the present document may also be stored in a computer-readable recording medium. The computer-readable recording medium includes all kinds of storage devices and distributed storage devices in which computer-readable data is stored. The computer-readable recording medium may be, for example, a Blu-ray Disc (BD), a Universal Serial Bus (USB), a ROM, a PROM, an EPROM, an EEPROM, a RAM, a CD-ROM, magnetic tape, floppy disk, and optical data storage devices. In addition, the computer-readable recording medium includes media implemented in the form of a carrier wave (for example, transmission over the Internet). In addition, the bit stream generated by the encoding method may be stored in a computer-readable recording medium or transmitted over a wired or wireless communication network.

Further, an embodiment(s) of the present document may be implemented as a computer program product by program code, and the program code may be executed in a computer according to an embodiment(s) of the present document. The program code may be stored on a carrier readable by a computer.

Figure 13:
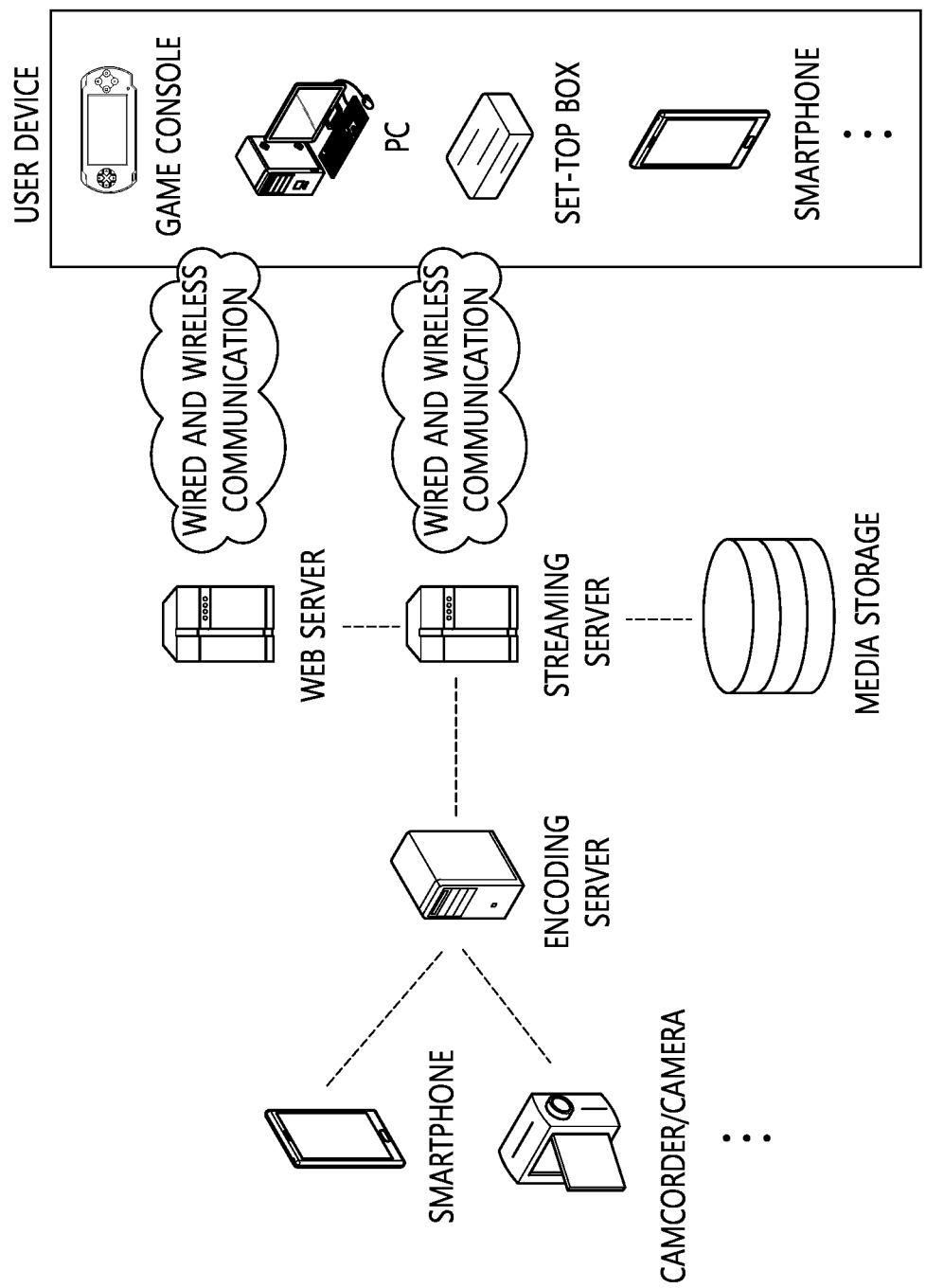
FIG. 13 illustrates an example of a content streaming system to which the exemplary embodiments disclosed in the present document are applicable.

FIG. 13 is a diagram illustrating a structure of a content streaming system to which the embodiments of the present document are applied.

Referring to FIG. 13, the content streaming system to which the embodiments of the present document are applied may largely include an encoding server, a streaming server, a web server, a media storage, a user device, and a multimedia input device.

The encoding server serves to compress the content input from the multimedia input devices such as a smartphone, a camera, and a camcorder into the digital data to generate a bitstream and transmit the bitstream to the streaming server. As another example, if the multimedia input devices such as a smartphone, a camera, and a camcorder directly generate the bitstream, the encoding server may be omitted.

The bitstream may be generated by the encoding method to which the embodiments of the present document are applied or the bitstream generation method, and the streaming server may temporarily store the bitstream in the process of transmitting or receiving the bitstream.

The streaming server serves to transmit the multimedia data to the user device based on the user request through the web server, and the web server serves as a medium which informs the user of what services are available. When the user requests the desired service to the web server, the web server delivers the user's request to the streaming server, and the streaming server transmits the multimedia data to the user. At this time, the content streaming system may include a separate control server, and in this case, the control server serves to control commands/responses between the devices within the content streaming system.

The streaming server may receive the contents from the media storage and/or the encoding server. For example, when receiving the contents from the encoding server, the streaming server may receive the contents in real time. In this case, to provide the smooth streaming service, the streaming server may store the bitstream for a predetermined time.

As an example of the user device, there may be a portable phone, a smartphone, a laptop computer, a digital broadcast terminal, a personal digital assistants (PDA), a portable multimedia player (PMP), a navigation device, a slate PC, a tablet PC, an ultrabook, a wearable device (e.g., a smart watch, a smart glass, a head mounted display (HMD)), a digital TV, a desktop computer, a digital signage, or the like.

The respective servers within the content streaming system may be operated by a distribution server, and in this case, the data received by each server may be distributed and processed.

Claims described in the present specification may be combined in various methods. For example, the technical features of method claims of the present specification may be combined and implemented as a device, and the technical features of device claims of the present specification may be combined and implemented as a method. Further, the technical features of the method claims of the present specification and the technical features of the device claims thereof may be combined and implemented as a device, and the technical features of the method claims of the present specification and the technical features of the device claims thereof may be combined and implemented as a method.

What is claimed is:

1. An image decoding method performed by a decoding apparatus, comprising:
    obtaining image information through a bitstream, wherein the image information includes a picture header;
    deriving a reference picture list for a current block based on information related to the reference picture list included in the picture header;
    generating prediction samples for the current block based on the reference picture list; and
    generating reconstructed samples for the current block based on the prediction samples,
    wherein the picture header includes a non-reference picture flag related to whether a current picture is not used as a reference picture and picture parameter set ID information related to an identifier for a picture parameter set in use,
    wherein the non-reference picture flag is included at a fixed first location relative to a starting point of the picture header in the picture header,
    wherein the picture header further includes a GDR_or_IRAP picture flag related to whether the current picture is a gradual decoding refresh (GDR) picture or an intra random access point (IRAP) picture and a GDR picture flag related to whether the current picture is the GDR picture,
    wherein the GDR picture flag is included in the picture header based on a value of the GDR_or_IRAP picture flag being equal to 1,
    wherein based on the value of the GDR_or_IRAP picture flag being equal to 1, the non-reference picture flag is included between a location of the GDR_or_IRAP picture flag and a location of the GDR picture flag,
    wherein the picture parameter set ID information is included at a fixed second location relative to the starting point of the picture header in the picture header, and
    wherein the fixed second location is not affected by a value of the information included in the picture header.

2. The method of claim 1,
    wherein the fixed first location is not affected by the value of information included in the picture header.

3. The method of claim 1,
    wherein the fixed first location is a location immediately following the location of the GDR_or_IRAP picture flag in the picture header.

4. The method of claim 3,
    wherein the non-reference picture flag is included at the fixed first location of the picture header regardless of whether the GDR picture flag is included in the picture header.

5. The method of claim 1,
    wherein the fixed second location is a location immediately following the fixed first location in the picture header, and
    wherein the picture parameter set ID information is included at the fixed second location of the picture header regardless of whether the GDR picture flag is included in the picture header.

6. The method of claim 1,
    wherein the picture parameter set ID information is decoded based on a descriptor of u(6).

7. The method of claim 4,
    wherein, based on a case that the GDR picture flag is not present in the picture header, a value of the GDR picture flag is derived as 0.

8. An image encoding method performed by an encoding apparatus, comprising:
    deriving a reference picture list for a current block;
    generating information related to the reference picture list based on the reference picture list;
    generating a picture header including the information related to the reference picture list; and
    encoding image information including the picture header,
    wherein the picture header includes a non-reference picture flag related to whether a current picture is not used as a reference picture and picture parameter set ID information related to an identifier for a picture parameter set in use,
    wherein the non-reference picture flag is included at a fixed first location relative to a starting point of the picture header in the picture header,
    wherein the picture header further includes a GDR_or_IRAP picture flag related to whether the current picture is a gradual decoding refresh (GDR) picture or an intra random access point (IRAP) picture and a GDR picture flag related to whether the current picture is the GDR picture,
    wherein the GDR picture flag is included in the picture header based on a value of the GDR_or_IRAP picture flag being equal to 1,
    wherein based on the value of the GDR_or_IRAP picture flag being equal to 1, the non-reference picture flag is included between a location of the GDR_or_IRAP picture flag and a location of the GDR picture flag,
    wherein the picture parameter set ID information is included at a fixed second location relative to the starting point of the picture header in the picture header, and wherein the fixed second location is not affected by a value of the information included in the picture header.

9. The method of claim 8, wherein the fixed first location is a location immediately following the location of the GDR_or_IRAP picture flag in the picture header.

10. The method of claim 9, wherein the non-reference picture flag is included at the fixed first location of the picture header regardless of whether the GDR picture flag is included in the picture header.

11. A non-transitory computer-readable digital storage medium for storing a bitstream generated by the image encoding method of claim 8.

12. A method for transmitting data for image information, comprising:
 deriving a reference picture list for a current block;
 generating information related to the reference picture list based on the reference picture list;
 generating a picture header including the information related to the reference picture list;
 encoding the image information including the picture header to generate a bitstream; and
 transmitting the data including the bitstream,
 wherein the picture header includes a non-reference picture flag related to whether a current picture is not used as a reference picture and picture parameter set ID information related to an identifier for a picture parameter set in use,
 wherein the non-reference picture flag is included at a fixed first location relative to a starting point of the picture header in the picture header,
 wherein the picture header further includes a GDR_or_IRAP picture flag related to whether the current picture is a gradual decoding refresh (GDR) picture or an intra random access point (IRAP) picture and a GDR picture flag related to whether the current picture is the GDR picture,
 wherein the GDR picture flag is included in the picture header based on a value of the GDR_or_IRAP picture flag being equal to 1,
 wherein based on the value of the GDR_or_IRAP picture flag being equal to 1, the non-reference picture flag is included between a location of the GDR_or_IRAP picture flag and a location of the GDR picture flag,
 wherein the picture parameter set ID information is included at a fixed second location relative to the starting point of the picture header in the picture header, and
 wherein the fixed second location is not affected by a value of the information included in the picture header.

* * * * *